United States Patent
Seo et al.

(10) Patent No.: US 12,454,782 B2
(45) Date of Patent: Oct. 28, 2025

(54) WASHING MACHINE AND METHOD FOR CONTROLLING THE SAME

(71) Applicant: SAMSUNG ELECTRONICS CO., LTD., Suwon-si (KR)

(72) Inventors: Sugkil Seo, Suwon-si (KR); Junhyun Park, Suwon-si (KR); Sungmo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 281 days.

(21) Appl. No.: 18/089,881

(22) Filed: Dec. 28, 2022

(65) Prior Publication Data
US 2023/0295854 A1  Sep. 21, 2023

Related U.S. Application Data

(63) Continuation of application No. PCT/KR2022/021016, filed on Dec. 22, 2022.

(30) Foreign Application Priority Data

Mar. 16, 2022  (KR) .................. 10-2022-0032864

(51) Int. Cl.
*D06F 34/18* (2020.01)
*D06F 33/34* (2020.01)
(Continued)

(52) U.S. Cl.
CPC .............. *D06F 34/18* (2020.02); *D06F 33/34* (2020.02); *D06F 33/36* (2020.02); *D06F 33/44* (2020.02);
(Continued)

(58) Field of Classification Search
CPC ...... D06F 34/18; D06F 33/34; D06F 2103/04; D06F 2103/06; D06F 2103/18;
(Continued)

(56) References Cited

U.S. PATENT DOCUMENTS 11,261,554 B2  3/2022  Park
11,447,904 B2  9/2022  Im et al.
(Continued)

FOREIGN PATENT DOCUMENTS

CN   112709044 A   4/2021
CN   113403800 A   9/2021
(Continued)

OTHER PUBLICATIONS

KR20170090162 translation (Year: 2017).*
(Continued)

*Primary Examiner* — Michael E Barr
*Assistant Examiner* — Lauren G Orta
(74) *Attorney, Agent, or Firm* — STAAS & HALSEY LLP

(57) ABSTRACT

A washing machine including a drum, a driving circuit configured to apply a driving current to a motor which rotates the drum, a current sensor configured to detect the driving current, and a controller configured to perform a weight detection process and a material detection process based on a selection of a laundry course, perform a current detection process in which a value of the driving current is detected while the drum is being rotated based on a type of material of the laundry determined in the material detection process, and determine a process condition to be applied to the laundry course identified by the selection based on the value of the driving current detected in the current detection process and a value of weight of the laundry determined in the weight detection process.

15 Claims, 18 Drawing Sheets

(51) Int. Cl.
  D06F 33/36 (2020.01)
  D06F 33/44 (2020.01)
  D06F 34/10 (2020.01)
  D06F 34/22 (2020.01)
  D06F 34/34 (2020.01)
  *D06F 101/00* (2020.01)
  *D06F 103/04* (2020.01)
  *D06F 103/06* (2020.01)
  *D06F 103/18* (2020.01)
  *D06F 103/46* (2020.01)
  *D06F 105/56* (2020.01)
  *D06F 105/58* (2020.01)

(52) U.S. Cl.
  CPC ............. *D06F 34/10* (2020.02); *D06F 34/22* (2020.02); *D06F 34/34* (2020.02); *D06F 2101/00* (2020.02); *D06F 2103/04* (2020.02); *D06F 2103/06* (2020.02); *D06F 2103/18* (2020.02); *D06F 2103/46* (2020.02); *D06F 2105/56* (2020.02); *D06F 2105/58* (2020.02)

(58) Field of Classification Search
  CPC .. D06F 2103/46; D06F 2105/56; D06F 33/44; D06F 2101/00; D06F 2105/58; D06F 33/36; D06F 34/10; D06F 34/22; D06F 34/34
  See application file for complete search history.

(56) References Cited

U.S. PATENT DOCUMENTS

| | | | |
|---|---|---|---|
| 11,603,616 B2 | 3/2023 | Jang et al. | |
| 2015/0113740 A1* | 4/2015 | Lee | ........................ D06F 34/18 68/12.04 |
| 2020/0040508 A1 | 2/2020 | Park | |
| 2020/0048813 A1 | 2/2020 | Schaumann et al. | |
| 2020/0102685 A1 | 4/2020 | Im et al. | |

FOREIGN PATENT DOCUMENTS

| | | | | |
|---|---|---|---|---|
| JP | 3227799 B2 | 11/2001 | | |
| JP | 4620977 B2 | 1/2011 | | |
| KR | 1999-0062394 | 7/1999 | | |
| KR | 2000-0043388 A | 7/2000 | | |
| KR | 10-1606046 B1 | 3/2016 | | |
| KR | 10-2017-0090162 A | 8/2017 | | |
| KR | 20170090162 A | * | 8/2017 | ............ D06F 34/18 |
| KR | 10-2018-0038727 | 4/2018 | | |
| KR | 10-2018-0119011 A | 11/2018 | | |
| KR | 10-2019-0092334 A | 8/2019 | | |
| KR | 10-2020-0026043 | 3/2020 | | |
| KR | 10-2021-0030810 A | 3/2021 | | |
| KR | 10-2021-0041306 | 4/2021 | | |
| KR | 10-2021-0096347 | 8/2021 | | |

OTHER PUBLICATIONS

International Search Report dated Apr. 18, 2023 in International Patent Application No. PCT/KR2022/021016.

PCT/ISA/237 dated Apr. 18, 2023 in International Patent Application No. PCT/KR2022/021016.

Extended European Search Report issued Jan. 24, 2025 for European Application No. 22932418.1.

* cited by examiner

WASHING MACHINE AND METHOD FOR CONTROLLING THE SAME

CROSS-REFERENCE TO RELATED APPLICATION

This application is a continuation application, under 35 U.S.C. § 111(a), of international application No. PCT/KR2022/021016, filed on Dec. 22, 2022, which claims priority under 35 U. S. C. § 119 to Korean Patent Application No. 10-2022-0032864, filed on Mar. 16, 2022, the disclosures of which are incorporated herein by reference in their entirety.

BACKGROUND

1. Field

The disclosure relates to a washing machine and method for controlling the same, and more particularly, to a washing machine and method for controlling the same capable of performing a laundry cycle to which an optimal process condition is applied by analyzing the type of laundry in more detail.

2. Discussion of Related Art

In general, a washing machine may include a tub and a drum rotationally installed in the tub and do the laundry by rotating the drum containing clothes inside the tub. The washing machine may perform a laundry cycle including a washing process for washing the clothes, a rinsing process for rinsing the washed clothes, and a dehydrating process for dehydrating the clothes.

Recently, technologies for performing an optimal laundry cycle for each type of laundry are being developed.

For example, the washing machine detects weight and a material of the laundry to perform a laundry cycle, to which a process condition that fits the weight and the material of the laundry is applied.

SUMMARY

According to an aspect of the disclosure, a washing machine comprising: a drum within a tub; a driving circuit configured to apply a driving current to a motor to rotate the drum; a current sensor configured to detect the driving current applied to the motor that rotates the drum; and a controller configured to: in response to a first laundry course being selected and started, perform a weight detection process and a material detection process, in response to a type of material of laundry in the drum being determined as a first material in the material detection process, perform a current detection process in which values of the driving current are detected while the drum is being rotated, and determine a process condition to be applied to the first laundry course based on the values of the driving current detected in the current detection process and a value of weight of the laundry determined in the weight detection process.

The controller may further determine a density value corresponding to a density of the laundry based on a ratio of an average of values of the driving current that are detected in the current detection process and the value of the weight of the laundry, determine a process condition of the first laundry course as a first process condition in response to the density value smaller than a preset value and determine a process condition of the first laundry course as a second process condition in response to the density value equal to or greater than the preset value.

In response to the type of material of the laundry being determined as a second material in the material detection process, the controller may determine the process condition of the first laundry course to correspond to that of the second material.

The material detection process may include a first rotation process to rotate the drum, a water supply process to supply water into the tub after completion of the first rotation process and a second rotation process to rotate the drum after completion of the water supply process.

The washing machine may further include a water level sensor to detect a level of water in the tub, and the controller may perform a water supply process before the current detection process based on the level of the water detected in the tub lower than a reference water level after the material detection process.

The washing machine may further include a display to display a remaining time of the laundry course, and the controller may control the display to display a default remaining time based on the selection of the laundry course, and control the display to display a default remaining time based on a selection of the first laundry course, and control the display to change the default remaining time to a remaining time corresponding to the determined process condition to be applied to the laundry course.

At least an amount of a detergent, an amount of water or a period of time required to complete a laundry cycle according to the process condition may be greater than an amount of the detergent, an amount of water or a period of time required to complete a laundry cycle according to the second process condition.

The controller may in response to a second laundry course being selected and started, perform the weight detection process, a water supply process, and the current detection process, a first process condition being applied to the second laundry course, and determine whether to change the first process condition based on the value of the driving current detected in the current detection process and the value of weight of the laundry determined in the weight detection process.

The controller may determine a density value corresponding to a density of the laundry based on a ratio of an average of values of driving current detected in the current detection process and the value of the weight of the laundry, and change the first process condition to a second process condition in response to the density value determined being equal to or greater than a preset value.

The washing machine may further include a display for displaying a remaining time of the second laundry course, and the controller may control the display to display a remaining time corresponding to the first process condition based on the selection of the second laundry course, and change the remaining time corresponding to the first process condition to the remaining time corresponding to the second process condition based on the change from the first process condition to the second process condition.

According to an aspect of the disclosure, a method of controlling a washing machine includes in response to a first course being selected and started, performing a weight detection process and a material detection process; in response to a type of material of laundry in a drum being determined as a first material in the material detection process, performing a current detection process in which values of driving currents are detected while the drum is being rotated; and determining a process condition to be applied to the first laundry course based on the values of driving current detected in the current detection process and a value of weight of the laundry determined in the weight detection process.

The determining of the process condition of the first laundry course may include determining a density value corresponding to a density of the laundry based on a ratio of an average of values of the driving current that are detected in the current detection process and the value of the weight of the laundry; determining a process condition of the first laundry course as a first process condition in response to the density value smaller than a preset value; and determining the process condition of the first laundry course as a second process condition in response to the density value equal to or greater than the preset value.

The method may further include in response to the type of material of the laundry being determined as a second material in the material detection process, determining the process condition of the first laundry course to correspond to that of the second material.

The material detection process may include a first rotation process to rotate the drum, a water supply process to supply water into a tub after completion of the first rotation process, and a second rotation process to rotate the drum after completion of the water supply process.

The method may further include performing a water supply process before the current detection process based on a level of water in the tub being lower than a preset water level after the material detection process.

The method may further include displaying a default remaining time based on the selection of the laundry course; and changing the default remaining time to a remaining time corresponding to the determined process condition to be applied to the first laundry course.

At least an amount of a detergent, an amount of water or a period of time required to complete a laundry cycle according to the first process condition may be larger than an amount of the detergent, an amount of water or a period of time required to complete a laundry cycle according to the second process condition.

The method may further include in response to a second laundry course being selected and started, performing the weight detection process, a water supply process, and the current detection process, a first process condition being applied to the second laundry course, and determining whether to change the first process condition based on the value of the driving current detected in the current detection process and the value of weight of the laundry determined in the weight detection process.

The determining of whether to change the first process condition may include determining a density value corresponding to a density of the laundry based on a ratio of an average of values of the driving current detected in the current detection process and the value of the weight of the laundry; and changing the first process condition to the second process condition in response to the density value equal to or greater than a preset value.

The method may further include displaying a remaining time corresponding to the first process condition based on a selection of the second laundry course; and changing the remaining time corresponding to the first process condition to a remaining time corresponding to the second process condition based on the changing from the first process condition to the second process condition.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
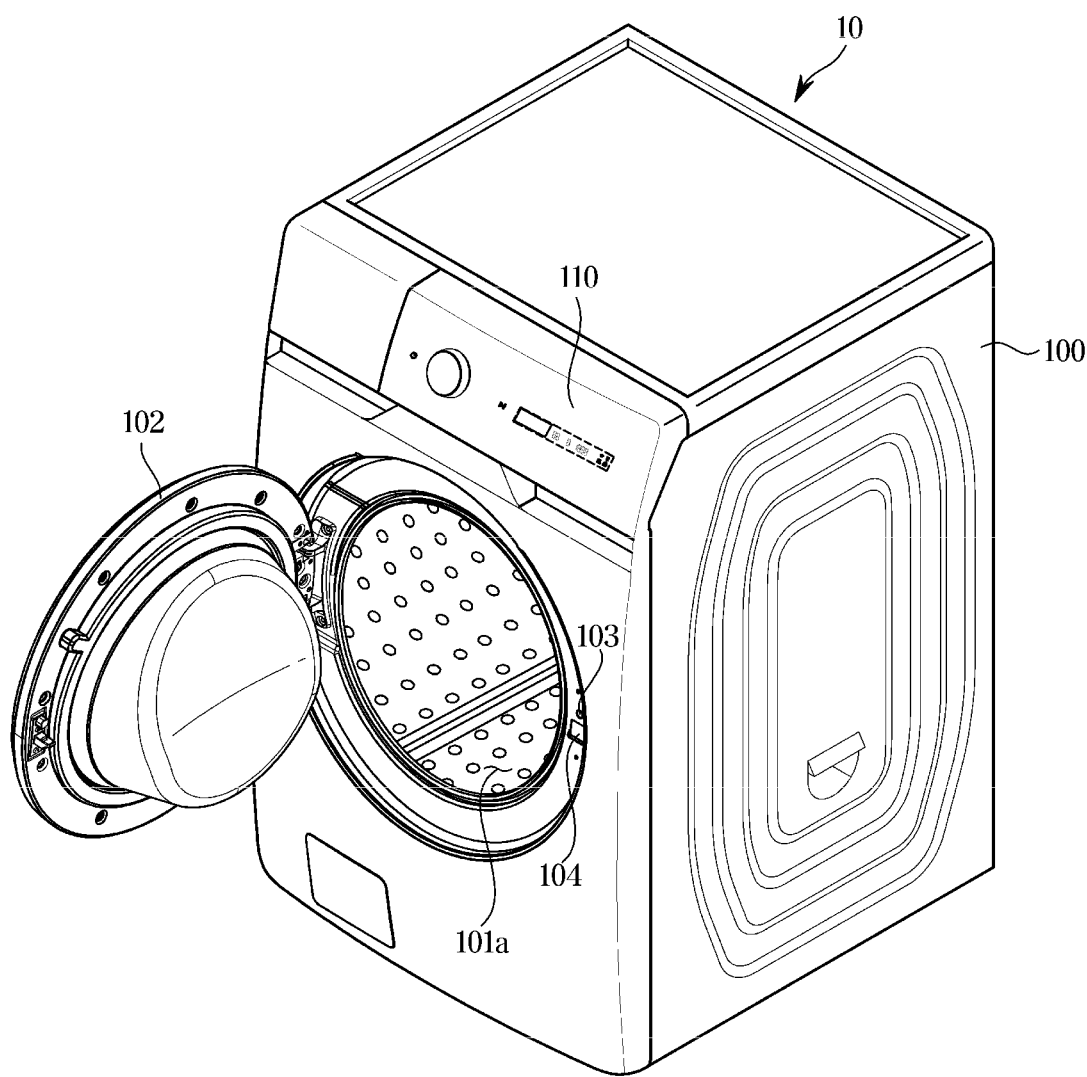
FIG. 1 is an exterior view of a washing machine, according to an embodiment of the disclosure.
Figure 1:
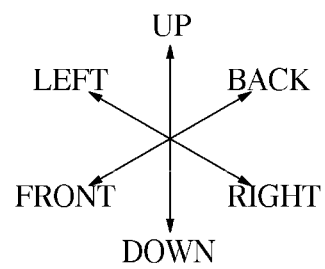

Embodiments and features as described and illustrated in the disclosure are merely examples, and there may be various modifications replacing the embodiments and drawings at the time of filing this application.

The terminology used herein is for the purpose of describing particular embodiments only and is not intended to limit the disclosure.

For example, the singular forms "a", "an" and "the" as herein used are intended to include the plural forms as well, unless the context clearly indicates otherwise.

The terms "comprises" and/or "comprising," when used in this specification, represent the presence of stated features, integers, steps, operations, elements, components or combinations thereof, but do not preclude the presence or addition of one or more other features, integers, steps, operations, elements, components, or combinations thereof.

The term including an ordinal number such as "first", "second", or the like is used to distinguish one component from another and does not restrict the former component.

Furthermore, the terms, such as "— part", "— block", "— member", "— module", etc., may refer to a unit of handling at least one function or operation. For example, the terms may refer to at least one process handled by hardware such as a field-programmable gate array (FPGA)/application specific integrated circuit (ASIC), etc., software stored in a memory, or at least one processor.

The disclosure provides a washing machine and method for controlling the same, which according to an embodiment identifies laundry with a large volume for the weight and provides an optimal process condition.

A washing machine performing a laundry cycle to which an optimal process condition is applied by analyzing a type of laundry in detail.

An embodiment of the disclosure will now be described in detail with reference to accompanying drawings. Throughout the drawings, like reference numerals or symbols refer to like parts or components.

The working principle and embodiments of the disclosure will now be described with reference to accompanying drawings.

Figure 2:
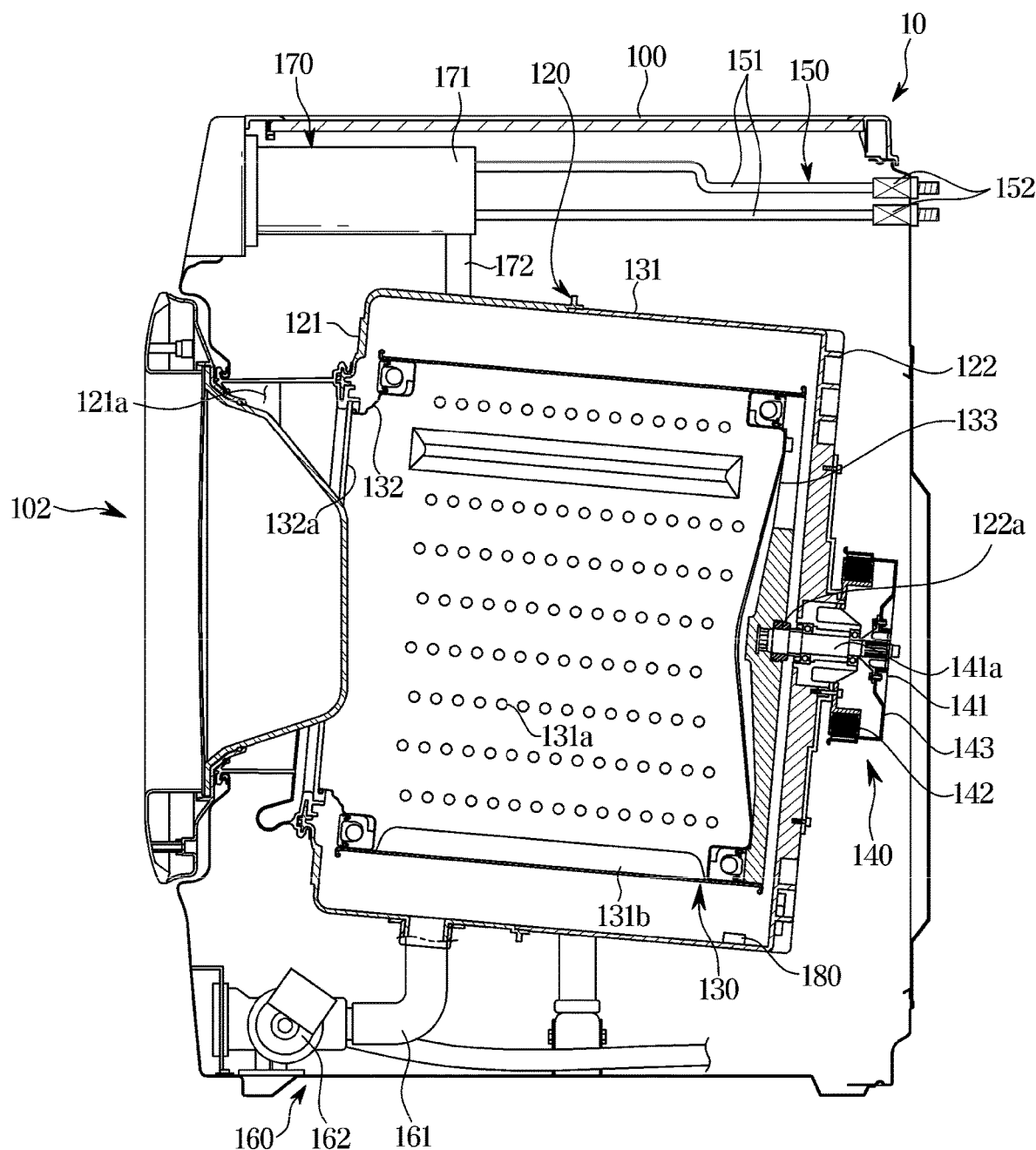
FIG. 2 is a side cross-sectional view of a washing machine, according to an embodiment of the disclosure.

FIG. 1 is an exterior view of a washing machine, according to an embodiment of the disclosure, and FIG. 2 is a side cross-sectional view of a washing machine, according to an embodiment of the disclosure.

Referring to FIGS. 1 and 2, described is a configuration of a washing machine 10.

In an embodiment of the disclosure, the washing machine 10 may be a drum-type washing machine for doing the laundry by repeating rising and falling of the laundry by rotating a drum 130.

Referring to FIGS. 1 to 2, the washing machine 10 may include a cabinet 100 and a door 102 arranged on the front of the cabinet 100. An inlet 101a may be formed in the middle of the front side of the cabinet 100 to draw in or out the laundry (or also referred to as clothes). The door 102 may be provided to open or close the inlet 101a. The door 102 may be mounted with a hinge to pivot on one side. That the inlet 101a is closed by the door 102 may be detected by a door switch 103. When the inlet 101a is closed and the washing machine 10 operates, the door 102 may be locked by a door lock 104.

The washing machine 10 may also include a control panel 110, a tub 120, the drum 130, a driver 140, a water supplier 150, a drainage 160, a detergent supplier 170 and a water level sensor 180.

The control panel 110 including an input 112 for receiving a user input and a display 111 for displaying operation information of the washing machine 10 may be arranged in an upper portion of the front side of the cabinet 100. The control panel 110 may provide the user with a user interface to interact with the washing machine 10.

The tub 120 may be arranged inside the cabinet 100 and may contain water for washing and/or rinsing. The tub 120 may include tub front parts 121 with an opening 121a formed on the front and tub rear parts 122 in the shape of a cylinder with a closed rear side. The opening 121a through which to draw in or out clothes to or from the drum 130 may be formed on the tub front parts 121. A bearing 122a is arranged on the rear wall of the tub rear parts 122 to rotationally fix a motor 141.

The drum 130 may be rotationally arranged in the tub 120 and may contain the clothes to be washed. The drum 130 may include a cylindrical drum body 131, drum front parts 132 arranged on the front of the drum body 131 and drum rear parts 133 arranged on the back of the drum body 131. The tub 120 and the drum 130 may be positioned at an angle to the ground. However, it is also possible that the tub 120 and the drum 130 are positioned to be parallel with the ground.

On the inner surface of the drum body 131, through holes 131a connecting the inside of the drum 130 to the inside of the tub 120 and a lifter 131b for lifting the clothes up the drum 130 during rotation of the drum 130 may be arranged. An opening 132a through which to draw in or out clothes to or from the drum 130 may be formed on the drum front parts 132. The drum rear parts 133 may be connected to a shaft 141a of the motor 141 that rotates the drum 130. The motor 141 may rotate the drum 130. The motor 141 may include the driver 140.

The motor 141 may be arranged on the outside of the tub rear parts 122 and connected to the drum rear parts 133 through the shaft 141a. The shaft 141a may penetrate the tub rear parts 122 and may be rotationally supported by the bearing 122a arranged on the tub rear parts 122.

The motor 141 may include a stator 142 fixed on the outside of the tub rear parts 122 and a rotor 143 rotationally arranged and connected to the shaft 141a. The rotor 143 may be rotated by magnetic interaction with the stator 142, and the rotation of the rotor 143 may be delivered to the drum 130 through the shaft 141a. The motor 141 may include, for example, a brushless direct current motor (BLDC motor) or a permanent synchronous motor (PMSM) capable of easily controlling the rotation speed.

In various embodiments of the disclosure, the washing machine 10 may further include a pulsator (not shown) that rotates separately from the drum 130.

The pulsator may separately rotate from the drum 130 to form a water flow in the drum 130.

In an embodiment of the disclosure, the pulsator may receive power from the motor 141, or may receive power from a pulsator motor provided separately from the motor 141.

When the pulsator receives power from the motor 141, the motor 141 may be implemented by a dual rotor motor equipped with one stator and two rotors (e.g., an inner rotor and an outer rotor), and one of the two rotors may be connected to the drum 130 and the other one may be connected to the pulsator.

The water supplier 150 may supply water to the tub 120 and the drum 130. The water supplier 150 may include a water supply tube 151 connected to an external water source to supply water to the tub 120, and a water supply valve 152 arranged in the water supply tube 151. The water supply tube 151 may be arranged above the tub 120 and may extend to a detergent container 171 from the external water source. The water may flow to the tub 120 via the detergent container 171.

The water supply valve 152 may open or close the water supply tube 151 in response to an electric signal from the controller 190. In other words, the water supply valve 152 may allow or block the supply of water to the tub 120 from the external water source. The water supply valve 152 may include, for example, a solenoid valve that is opened or closed in response to an electric signal.

The drainage 160 may drain out the water stored in the tub 120 and/or the drum 130. The drainage 160 may include a drain tube 161 extending from the bottom of the tub 120 to the outside of the cabinet 100, and a drain pump 162 arranged at the drain tube 161. The drain pump 162 may pump the water in the drain tube 161 out of the cabinet 100.

The detergent supplier 170 may supply a detergent to the tub 120 and/or the drum 130. The detergent supplier 170 may be arranged above the tub 120 and may include the detergent container 171 and a mixing tube 172 that connects the detergent container 171 to the tub 120. The detergent container 171 may be connected to the water supply tube 151, and the water supplied through the water supply tube 151 may be mixed with the detergent in the detergent container 171. The mixture of the detergent and the water may be supplied to the tub 120 through the mixing tube 172.

Figure 3:
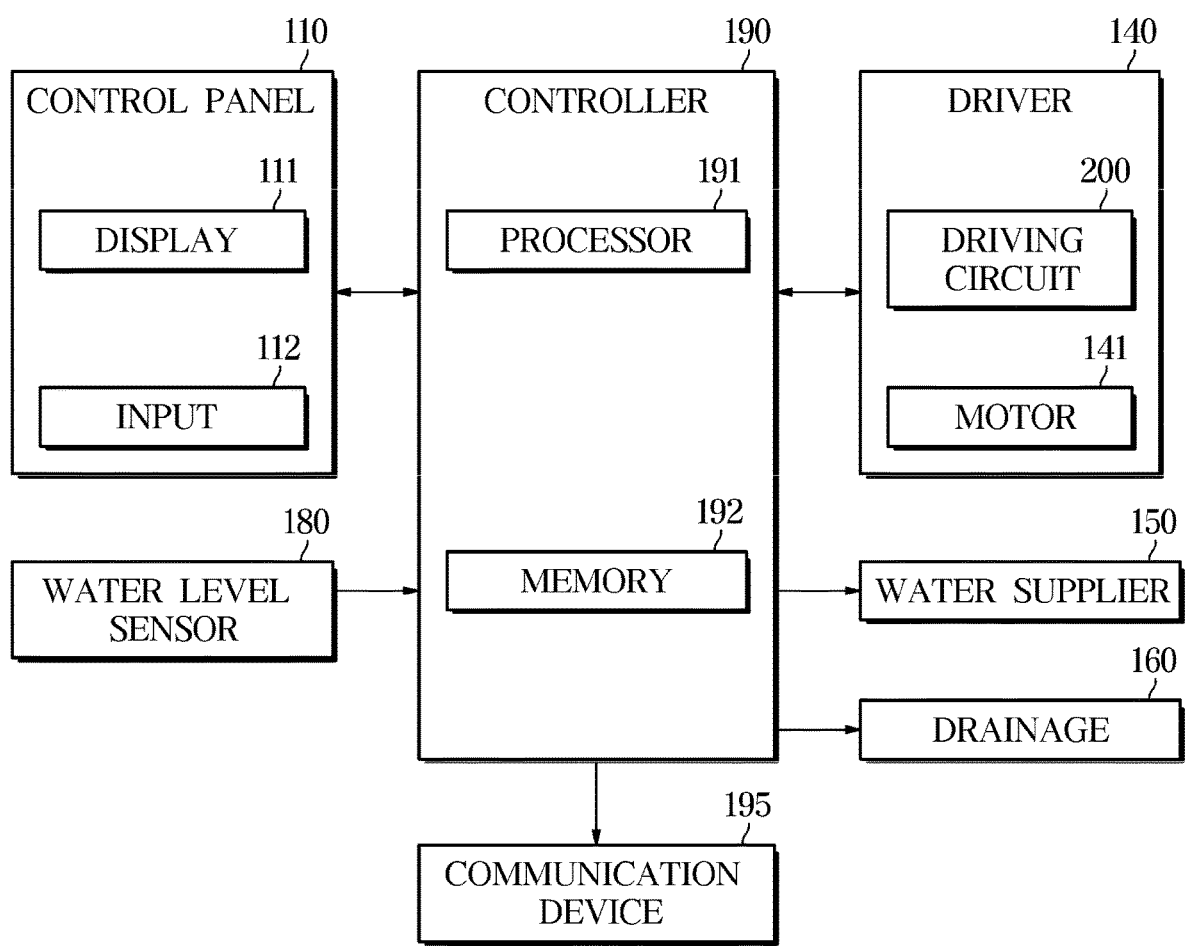
FIG. 3 is a block diagram illustrating a configuration of a washing machine, according to an embodiment of the disclosure.
Figure 4:
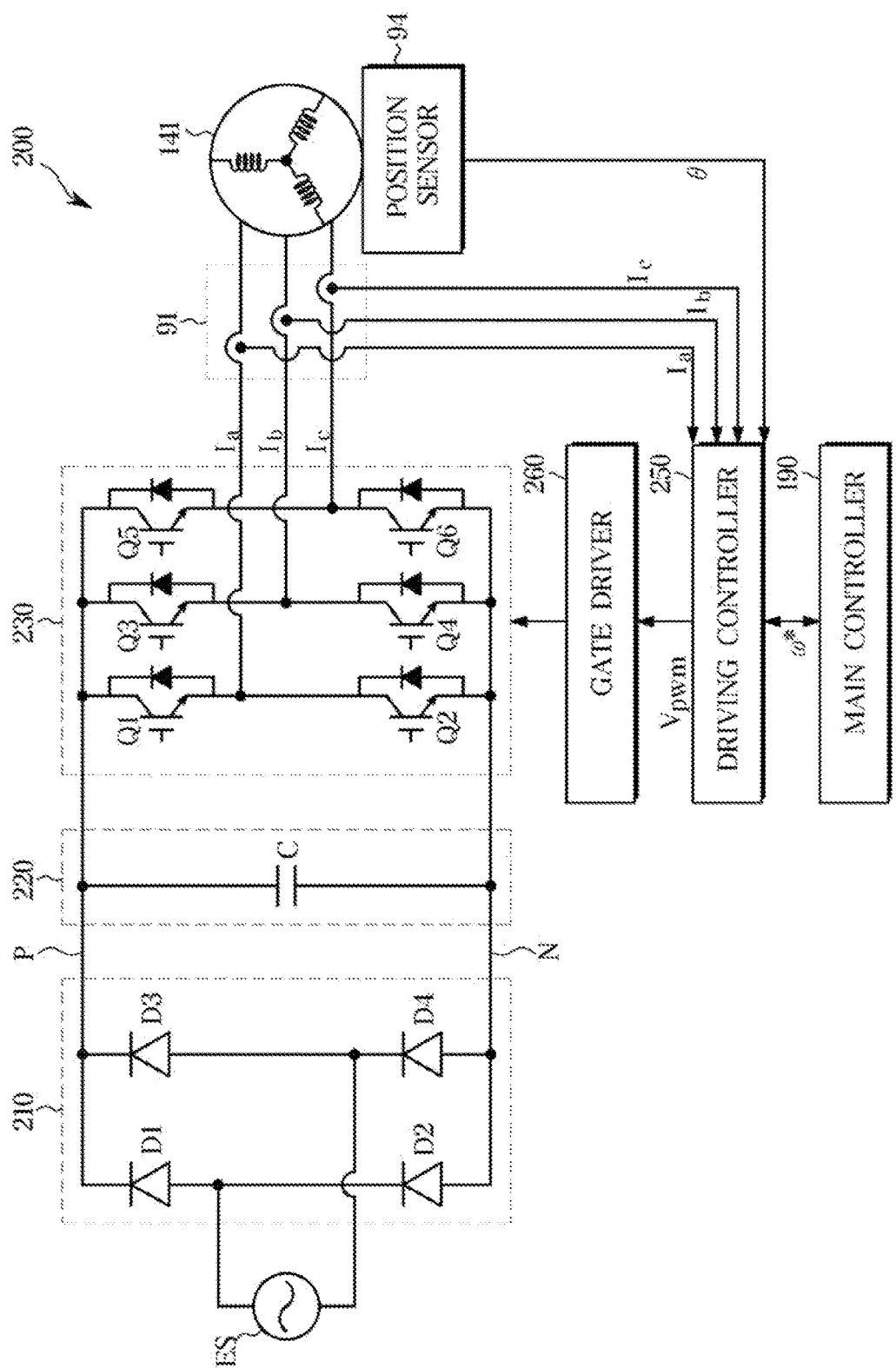
FIG. 4 illustrates an example of a driving circuit included in a washing machine, according to an embodiment of the disclosure.
Figure 5:
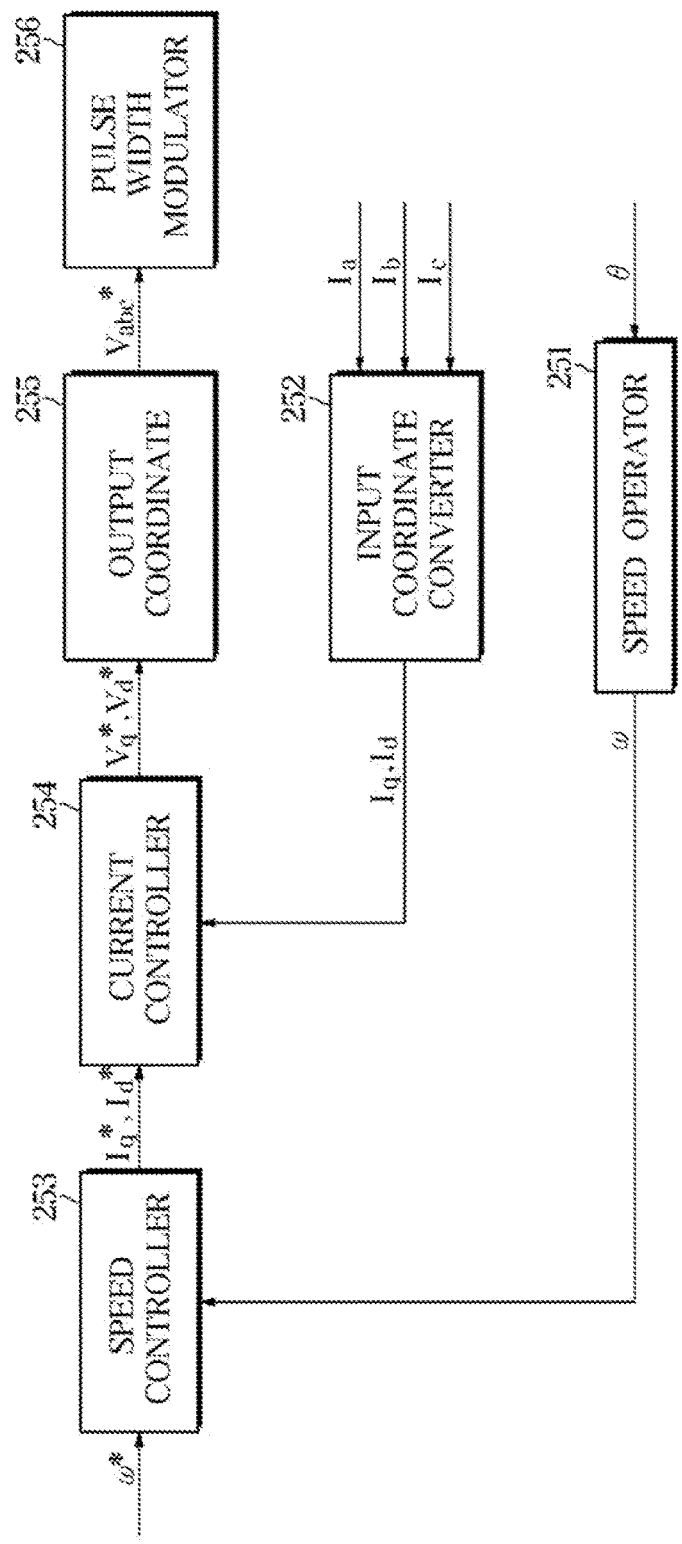
FIG. 5 illustrates an example of a driving controller included in a washing machine, according to an embodiment of the disclosure.

FIG. 3 is a block diagram of a washing machine, according to an embodiment of the disclosure, FIG. 4 illustrates an example of a driving circuit included in a washing machine, according to an embodiment of the disclosure, and FIG. 5 illustrates an example of a driving controller included in a washing machine, according to an embodiment of the disclosure.

The washing machine 10 may include not only the mechanical components described in connection with FIGS. 1 and 2 but also electrical/electronic components as will be described below.

Referring to FIGS. 3, 4 and 5, the washing machine 10 may include the control panel 110, the driver 140, the water supplier 150, the drainage 160, the water level sensor 180, a controller 190, and a communication device 195.

The washing machine 10 may include the control panel 110, the driver 140, the water supply valve 152, the drain pump 162, the water level sensor 180, the controller 190 and/or the communication device 195. The controller 190 may be electrically connected to the components of the washing machine 10 to control the respective components.

The control panel 110 may include the display 111 for displaying a laundry setting and/or laundry operation information in response to a user input, and the input 112 for receiving the user input. The control panel 110 may provide the user with a user interface to interact with the washing machine 10. The input 112 may include, for example, a power button, a start button, a course selection dial, and a detailed setting button. The input 112 may also include a tact switch, a push switch, a slide switch, a toggle switch, a micro switch, or a touch switch.

The display 111 may include a screen for displaying various information and an indicator for indicating detailed settings selected by a setting button. The display 111 may include, for example, a liquid crystal display (LCD) panel and/or a light emitting diode (LED).

A laundry course of the washing machine 10 may include a preset process condition (e.g., laundry temperature, the number of rinsing times, and dehydration intensity) depending on the type of laundry (or clothes) (e.g., shirts, pants, underwear, or bedclothes), the material of the laundry (e.g., cotton, polyester or wool) and an amount of the laundry. For example, a standard laundry course may include a universal process condition for the laundry. A bedclothes laundry course may include a process condition optimized to wash bedclothes. There may be various laundry courses such as standard washing, powerful washing, wool washing, bedclothes washing, normal clothes washing, infant clothes washing, towel washing, minimal washing, boiling washing, economic washing, outdoor clothes washing, rinsing and dehydrating, dehydrating, etc.

The driver 140 may include the motor 141 and a driving circuit 200. The driving circuit 200 may apply a driving current to the motor 141 for driving the motor 141 in response to a driving signal (a motor control signal) from the controller 190. The driving circuit 200 may rectify and convert alternate current (AC) power from an external power source ES to direct current (DC) power, and convert the DC power to sinusoidal driving power. The driving circuit 200 may include an inverter for outputting the converted driving power to the motor 141. The inverter may include a plurality of switching devices, and open (turn off) or close (turn on) the plurality of switching devices based on a driving signal from the controller 190. A driving current may be applied to the motor 141 according to the opening or closing of the switching devices. Furthermore, the driving circuit 200 may include a current sensor 91 for measuring a driving current output from the inverter.

The controller 190 may calculate a rotation speed of the motor 141 based on an electrical angle of the rotor. The electrical angle of the rotor may be obtained from a position sensor 94 equipped on the motor 141. For example, the controller 190 may calculate the rotation speed of the motor 141 based on a change in the electrical angle of the rotor for a sampling time interval. The position sensor 94 may be implemented by a hall sensor, an encoder, or a resolver that is able to measure a position of the rotor 143 of the motor 141. Furthermore, the controller 190 may calculate a rotation speed of the motor 141 based on a driving current value measured by the current sensor 91.

In various embodiments of the disclosure, the controller 190 may determine weight, a material and/or a density of the laundry based on the driving current value measured by the current sensor 91.

The motor 141 may rotate the drum 130 under the control of the controller 190. The controller 190 may drive the motor 141 to follow a target rotation speed.

Specifically, as shown in FIG. 4, the driving circuit 200 may include a rectifying circuit 210 for rectifying AC power from the external power source ES, a DC link circuit 220 for eliminating ripples of the rectified power and outputting DC power, an inverter circuit 230 for converting the DC power to sinusoidal driving power and outputting a driving current $I_{abc}$ to the motor 141, a current sensor 91 for measuring driving currents $I_a$, $I_b$, and $I_c$ applied to the motor 141, a driving controller 250 for controlling driving power conversion of the inverter circuit 230, and a gate driver 260 for turning on or off switching circuits Q1, Q2, Q3, Q4, Q5 and Q6 included in the inverter circuit 230 based on a driving signal from the driving controller 250.

Furthermore, the position sensor 94 for measuring a position (an electrical angle) of the rotor 143 of the motor 141 may be provided on each motor 141.

The rectifying circuit 210 may include a diode bridge including a plurality of diodes D1, D2, D3 and D4. The diode bridge is arranged between a positive terminal P and a negative terminal N of the driving circuit 200. The rectifying circuit 210 may rectify the AC power (AC voltage and AC current) that changes in magnitude and direction over time to power having a constant direction.

The DC link circuit 220 includes a DC link capacitor C for storing electric energy. The DC link capacitor C is arranged between the positive terminal P and the negative terminal N of the driving circuit 200. The DC link circuit 220 may receive the power rectified by the rectifying circuit 210 and output DC power with a constant magnitude and direction.

The inverter circuit 230 may include three pairs of switching devices Q1 and Q2, Q3 and Q4, and Q5 and Q6 arranged between the positive terminal P and the negative terminal N of the driving circuit 200. Specifically, the inverter circuit 230 may include a plurality of upper switching devices Q1, Q3 and Q5 and a plurality of lower switching devices Q2, Q4 and Q6.

The switching device pairs Q1 and Q2, Q3 and Q4 and Q5 and Q6 may each include two switching devices Q1 and Q2, Q3 and Q4 or Q5 and Q6 connected in series. The switching devices Q1, Q2, Q3, Q4, Q5 and Q6 included in the inverter circuit 230 may each be turned on/off by an output of the gate driver 260, so that 3-phase driving current $I_a$, $I_b$, and $I_c$ may be applied to the motor 141.

The current sensor 91 may measure the 3-phase driving current (a-phase current, b-phase current and c-phase current) output from the inverter circuit 230, and output data representing the measured 3-phase driving current value $I_a$, $I_b$, $I_c$: $I_{abc}$ to the driving controller 250. Alternatively, the current sensor 91 may measure only 2-phase driving current among the 3-phase driving current $I_{abc}$, and the driving controller 250 may expect the other phase driving current from the two-phase driving current.

The position sensor 94 may be arranged on the motor 141 for measuring a position Θ (e.g., an electrical angle) of the rotor 143 of the motor 141 and outputting position data representing the electrical angle Θ of the rotor 143. The position sensor 94 may be implemented by a hall sensor, an encoder, a resolver, or the like.

The gate driver 260 may output a gate signal to turn on/off the plurality of switching circuits Q1, Q2, Q3, Q4, Q5 and Q6 included in the inverter circuit 230 based on an output of the driving controller 250.

The driving controller 250 may be provided separately from the controller 190. For example, the driving controller 250 may include an application specific integrated circuit (ASIC) for outputting a driving signal based on e.g., a rotation speed command ω*, the driving current value $I_{abc}$ and the rotor position Θ. Alternatively, the driving controller 250 may include a memory for storing a series of instructions for outputting a driving signal based on the rotation speed command ω*, the driving current value $I_{abc}$, and the rotor position Θ, and a processor for processing the series of instructions stored in the memory.

The driving controller 250 may be provided integrally with the controller 190. For example, the driving controller 250 may be implemented with a series of instructions for outputting a driving signal based on the rotation speed command ω*, the driving current value $I_{abc}$, and the rotor position Θ stored in the memory 192 of the controller 190.

The driving controller 250 may receive a motor control signal (e.g., a rotation speed command) from the controller 190, receive the driving current value $I_{abc}$ from the current sensor 91, and receive the rotor position Θ of the motor 141 from the position sensor 94. The driving controller 250 may determine a driving current value to be applied to the motor 141 based on the rotation speed command ω*, the driving current value $I_{abc}$ and the rotor position, and output a driving signal (pulse width modulation (PWM) signal) for controlling the inverter circuit 230 based on the determined driving current value.

The driving controller 250 may include a speed operator 251, an input coordinate converter 252, a speed controller 253, a current controller 254, an output coordinate converter 255 and a pulse width modulator 256, as shown in FIG. 5.

The speed operator 251 may calculate a rotation speed value ω of the motor 141 based on the electrical angle θ of the rotor of the motor 141. The electrical angle θ of the rotor may be received from the position sensor 94 arranged on the motor 141. For example, the speed operator 251 may calculate the rotation speed value ω of the motor 141 based on a change in the electrical angle θ of the rotor 143 for a sampling time interval.

When there is no position sensor 94 provided in an embodiment of the disclosure, the speed operator 251 may calculate the rotation speed value ω of the motor 141 based on the driving current value $I_{abc}$ measured by the current sensor 91.

An input coordinate converter 252 may convert the 3-phase driving current value $I_{abc}$ into d-axis current value $I_d$ and q-axis current value $I_q$ (hereinafter, d-axis current and q-axis current) based on the electrical angle θ of the rotor. In other words, the input coordinate converter 252 may perform axial conversion on the a-axis, the b-axis, and the c-axis of the 3-phase driving current value $I_{abc}$ into the d-axis and the q-axis. In this case, the d-axis refers to an axis in a direction corresponding to a direction of a magnetic field produced by the rotor of the motor 141, and the q-axis refers to an axis in a direction ahead by 90 degrees of a direction of the magnetic field produced by the rotor of the motor 141. The 90 degrees refer to an electrical angle rather than a mechanical angle of the rotor, and the electrical angle refers to a converted angle according to which an angle between neighboring N poles or neighboring S poles of the rotor is converted into 360 degrees.

Furthermore, the d-axis current may represent a current component of the driving current, which produces a magnetic field in the d-axis direction, and the q-axis current may represent a current component of the driving current, which produces a magnetic field in the q-axis direction.

The input coordinate converter 252 may calculate the q-axis current value $I_q$ and the d-axis current value $I_d$ from the 3-phase driving current value $I_{abc}$ according to a known method.

The speed controller 253 may compare the rotation speed command ω* from the controller 190 with the rotation speed value ω of the motor 141, and output a q-axis current command $I_q^*$ and a d-axis current command $I_d^*$ based on a result of the comparing. For example, the speed controller 253 may use proportional integral control (PI control) to calculate the q-axis current command $I_q^*$ and the d-axis current command $I_d^*$ to be applied to the motor 141 based on a difference between the rotation speed command ω* and the rotation speed value ω.

The current controller 254 may compare the q-axis current command $I_q^*$ and the d-axis current command $I_d^*$ output from the speed controller 253 with the q-axis current value $I_q$ and the d-axis current value $I_d$ output from the input coordinate converter 252, and output a q-axis voltage command $V_q^*$ and a d-axis voltage command $V_d^*$ based on a result of the comparing. Specifically, the current controller 254 may use PI control to determine the q-axis voltage command $V_g^*$ based on a difference between the q-axis current command $I_g^*$ and the q-axis current value $I_g$ and determine the d-axis voltage command $V_d^*$ based on a difference between the d-axis current command $I_d^*$ and the d-axis current value $I_d$.

The output coordinate converter 255 may convert a dq-axis voltage command $V_{dq}^*$ into 3-phase voltage commands (an a-phase voltage command, a b-phase voltage command, and a c-phase voltage command) vatic* based on the electrical angle Θ of the rotor of the motor 141.

The output coordinate converter 255 may convert the dq-axis voltage $V_{dq}^*$ to the 3-phase voltage command $V_{abc}^*$ according to a known method.

The pulse width modulator 256 may generate a PWM control signal Vpwm to turn on or turn off the switching circuits Q1, Q2, Q3, Q4, Q5 and Q6 of the inverter circuit 230 from the 3-phase voltage command $V_{abc}^*$. Specifically, the pulse width modulator 256 may perform PWM on the 3-phase voltage command $V_{abc}^*$ and output a PWMed PWM signal Vpwm to the gate driver 260.

As such, the driving controller 250 may output a driving signal (PWM signal) to the gate driver 260 based on a motor control signal (e.g., a rotation speed command) from the controller 190. Furthermore, the driving controller 250 may provide the driving current value $I_{abc}$, the dq-axis current value $I_{dq}$ and the dq-axis current command $I_{dq}^*$ to the controller 190.

As described above, the driving circuit 200 may apply a driving current to the motor 141 based on a motor control signal (e.g., a rotation speed command or a rotation deceleration command) from the controller 190.

The motor 141 may rotate the drum 130 depending on the driving current from the driving circuit 200. For example, the motor 141 may rotate the drum 130 based on the driving current so that the rotation speed of the drum 130 follows a rotation speed command output from the controller 190.

Furthermore, the motor 141 may decelerate the drum 130 so that the rotation speed of the drum 130 follows a rotation deceleration command output from the controller 190. The water supply valve 152 may be opened in response to a water supply signal from the controller 190. As the water supply valve 152 is opened, water may be supplied into the tub 120 through the water supply tube 151.

The drain pump 162 may discharge the water out of the cabinet 100 through the drain tube 161 in response to a drain signal from the controller 190. By the operation of the drain pump 162, the water stored in the tub 120 may be discharged out of the cabinet 100 through the drain tube 161.

In various embodiments of the disclosure, the washing machine 10 may include a vibration sensor (not shown) for detecting vibration of the tub 120. Specifically, the vibration sensor may detect the vibration of the tub 120 caused by rotation of the drum 130 while a laundry cycle (e.g., a dehydrating process) is being performed. Unbalance of clothes placed in the drum 130 may cause eccentricity of the drum 130, which may in turn cause a vibration of the tub 120. When the rotation speed of the motor 141 increases while the layout of the clothes is unbalanced, vibration of the tub 120 and the vibration noise may increase as well.

The water level sensor 180 may detect a water level in the tub 120. For example, the water level sensor 180 may be installed on the inner side of the bottom of the tub 120. As the water level in the tub 120 increases, the pressure applied to the water level sensor 180 increases, and accordingly, the water level sensor 180 may detect a frequency changing by the water level when the drum 130 rotates.

In an embodiment, the controller 190 may identify the water level in the tub 120 by analyzing a frequency (water level frequency) of the electric signal corresponding to the pressure measured by the water level sensor 180.

The controller 190 may include a processor 191 for generating a control signal for an operation of the washing machine 10, and a memory 192 for storing a program, an application, instructions and/or data for operation of the washing machine 10. The processor 191 and the memory 192 may be implemented with separate semiconductor devices or in a single semiconductor device. Furthermore, the controller 190 may include a plurality of processors or a plurality of memories. The controller 190 may be provided in various positions inside the washing machine 10. For example, the controller 190 may be included in a printed circuit board (PCB) arranged in the control panel 110.

The processor 191 may include an operation circuit, a storage circuit, and a control circuit. The processor 191 may include one or multiple chips. Furthermore, the processor 191 may include one or multiple cores.

The memory 192 may store a program for performing a laundry cycle according to a laundry course, a program for changing a process condition depending on the type of the laundry, and data including a process condition depending on the laundry course. Furthermore, the memory 192 may store a laundry course and a laundry setting (e.g., a dehydration mode) currently selected based on a user input.

In an embodiment of the disclosure, the memory 192 may store a program including an algorithm for performing a laundry cycle according to a laundry course and laundry settings, an algorithm for identifying a type of the laundry, an algorithm for changing the process condition of a laundry cycle depending on the type of the laundry, etc.

The memory 192 may include a volatile memory, such as a static random access memory (S-RAM) or a dynamic RAM (D-RAM), and a non-volatile memory, such as a read only memory (ROM) or an erasable programmable ROM (EPROM). The memory 192 may include a memory device, or multiple memory devices.

The processor 191 may process data and/or a signal based on the program provided from the memory 192, and transmit a control signal to each component of the washing machine 10 based on the processing result. For example, the processor 191 may process a user input received through the control panel 110. The processor 191 may output a control signal to control the display 111, the motor 141, the water supplier 150, and the drainage 160 in response to a user input.

In another example, the processor 191 may use a program provided from the memory 192 to figure out weight and a material of the laundry and furthermore, figure out a density of the laundry.

The processor 191 may control the driver 140, the water supplier 150 and the drainage 160 to perform a laundry cycle comprised of a washing process, a rinsing process and a dehydrating process according to a predetermined process condition. Furthermore, the processor 191 may control the control panel 110 to display a laundry setting and laundry operation information.

The processor 191 may also control the communication device 195 to transmit certain information to an external device.

The communication device 195 may transmit data to the external device or receive data from the external device under the control of the controller 190. For example, the communication device 195 may communicate with a server, a user terminal, and/or a home appliance to transmit or receive various data.

For this, the communication device 195 may support establishment of a direct (e.g., wired) communication channel or a wireless communication channel between external devices (e.g., a server, a user terminal and/or a home appliance), and communication through the established communication channel. According to an embodiment of the disclosure, the communication device 195 may include a wireless communication module (e.g., a cellular communication module, a short-range wireless communication module or a global navigation satellite system (GNSS) communication module) or a wired communication module (e.g., a local area network (LAN) communication module or a power-line communication module). A corresponding one of the communication modules may communicate with an external electronic device over a first network (e.g., a short-range communication network such as bluetooth, wireless-fidelity (Wi-Fi) direct or infrared data association (IrDA)) or a second network (e.g., a remote communication network such as a legacy cellular network, a fifth generation (5G) network, a next generation communication network, the Internet, or a computer network (e.g., a LAN or wide area network (WAN)). These various types of communication modules may be integrated in a single component (e.g., a single chip) or implemented by a plurality of separate components (e.g., a plurality of chips).

In various embodiments of the disclosure, the communication device 195 may establish communication with a user terminal through a server.

In various embodiments of the disclosure, the communication device 195 may include a Wi-Fi module, and perform communication with an external server and/or a user terminal based on establishment of communication with a home access point (AP).

Components of the washing machine 10 have thus far been described, but the washing machine 10 may include more different components within ordinary technologies.

Figure 6:
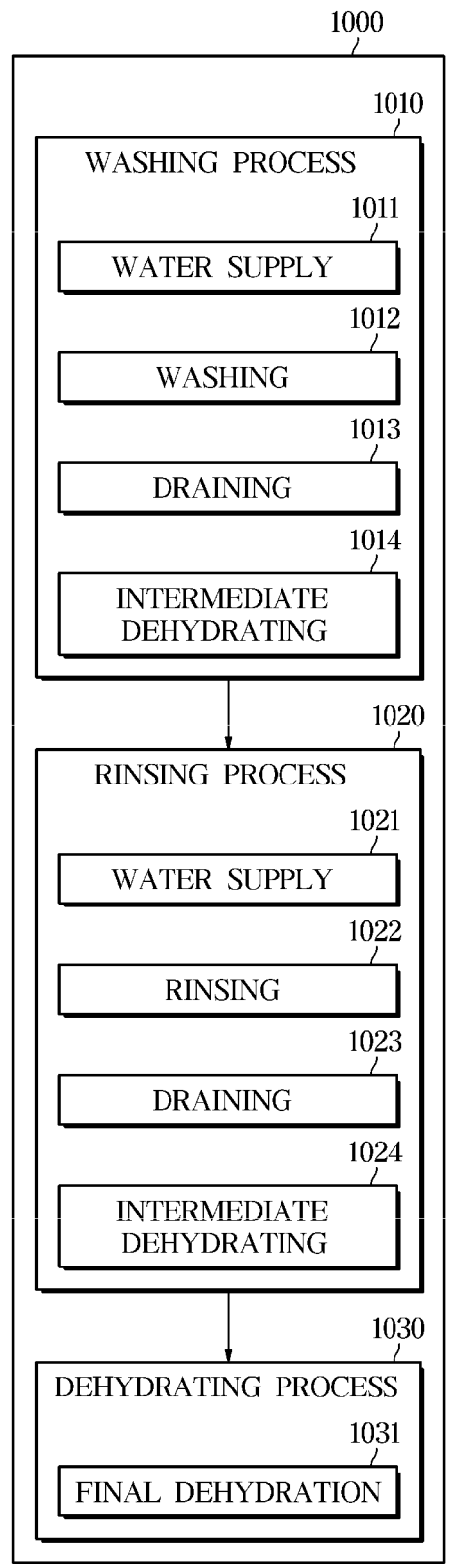
FIG. 6 illustrates an example of a laundry cycle of a washing machine, according to an embodiment of the disclosure.

FIG. 6 illustrates an example of a laundry cycle of a washing machine, according to an embodiment of the disclosure.

Referring to FIG. 6, the washing machine 10 may perform a washing process 1010, a rinsing process 1020 and a dehydrating process 1030 sequentially based on a user input to start a laundry cycle 1000.

That is, the laundry cycle 1000 may include the washing process 1010, the rinsing process 1020 and the dehydrating process 1030.

Clothes may be washed by the washing process 1010. Specifically, dirt on the clothes may be separated by chemical actions of a detergent and/or mechanical actions such as falling.

The washing process 1010 may include water supply 1011 for supplying water into the tub 120, washing 1012 for washing the clothes by rotating the drum 130 at low speed, draining 1013 for draining the water contained in the tub 120, and intermediate dehydrating 1014 for separating water from the clothes by rotating the drum 130 at high speed.

For the washing 1012, the controller 190 may control the driving circuit 200 to rotate the motor 141 in forward direction or reverse direction. Due to the rotation of the drum 130, the clothes may be washed by falling down the drum 130.

For the intermediate dehydrating 1014, the controller 190 may control the driving circuit 200 to rotate the motor 141 at high speed. Due to the high-speed rotation of the drum 130, water may be separated from the clothes contained in the drum 130 and drained out of the washing machine 10.

The rotation speed of the drum 130 may gradually increase during the intermediate dehydrating 1014. For example, the controller 190 may control the driving circuit 200 to rotate the motor 141 at a first rotation speed, and control the motor 141 so that the rotation speed of the motor 141 increases to a second rotation speed based on a change in driving current to the motor 141 while the motor 141 is rotating at the first rotation speed. The controller 190 may control the motor 141 so that the rotation speed of the motor 141 increases to a third rotation speed or the rotation speed of the motor 141 decreases to the first rotation speed based on a change in driving current of the motor 141 while the motor 141 is rotated at the second rotation speed.

The clothes may be rinsed by the rinsing process 1020. Specifically, the remnants of the detergent or dirt on the clothes may be washed by water.

The rinsing process 1020 may include water supply 1021 for supplying water into the tub 120, rinsing 1022 for rinsing the clothes by driving the drum 130, draining 1023 for draining water contained in the tub 120, and intermediate dehydrating 1024 for separating water from the clothes by driving the drum 130.

The water supply 1021, draining 1023 and intermediate dehydrating 1024 of the rinsing process 1020 may correspond to the water supply 1012, draining 1014 and intermediate dehydrating 1014 of the washing process 1010. During the rinsing process 1020, the water supply 1021, the rinsing 1022, the draining 1023 and the intermediate dehydrating 1024 may be performed one or multiple times.

The clothes may be dehydrated by the dehydrating process 1030. Specifically, water may be separated from the clothes by high-speed rotation of the drum 130, and the separated water may be discharged out of the washing machine 10.

The dehydrating process 1030 may include final dehydrating 1031 to separate water from the clothes by rotating the drum 130 at high speed. With the final dehydrating 1031, the last intermediate dehydrating 1024 of the rinsing process 1020 may be skipped.

For the final dehydrating 1031, the controller 190 may control the driving circuit 200 to rotate the motor 141 at high speed. Due to the high-speed rotation of the drum 130, water may be separated from the clothes contained in the drum 130 and drained out of the washing machine 10. The rotation speed of the motor 141 may gradually increase.

As the operation of the washing machine 10 is completed with the final dehydrating 1031, performance time of the final dehydrating 1031 may be longer than performance time of the intermediate dehydrating 1014 or 1024.

As described above, the washing machine 10 may perform a laundry cycle to do the laundry. During the intermediate dehydrating 1014 and 1024 and the final dehydrating 1031 in particular, the washing machine 10 may gradually increase the rotation speed of the motor 141 for rotating the drum 130, and increase or decrease the rotation speed of the motor 141 based on a change in driving current to the motor 141.

The memory 192 may store a process condition corresponding to each of the plurality of laundry courses and/or an algorithm for changing the process condition.

The process condition corresponding to each of the plurality of laundry courses may be differently set to minimize damage of the clothes and attain a maximum washing effect.

The process condition refers to a condition associated with at least one of the washing process 1010, the rinsing process 1020 or the dehydrating process 1030.

For example, the process condition may include an amount of water supplied, an amount of detergent supplied, laundry time, an operation rate, an alternate rotation pattern, the number of times of rinsing and/or dehydration intensity.

The process condition may be changed according to a laundry course selected by the user, or may be differently set depending on the density of the laundry and/or the material of the laundry.

For example, the amount of water supplied, the amount of detergent supplied and/or the laundry time may be differently set depending on the density of the laundry even under the same weight and material conditions.

Depending on the laundry settings and the type of the laundry course, one of the aforementioned processes 1010, 1020 and 1030 may be omitted from the laundry cycle 1000 or a new process may be added to the laundry cycle 1000.

For example, the laundry cycle 1000 may further include a laundry measurement process for measuring weight of the laundry before the water supply 1011.

Furthermore, depending on the laundry settings and the type of the laundry course, processes separate from the laundry cycle 1000 may be added.

For example, before the laundry cycle 1000 is proceeded, the washing machine may perform a weight detection process q, a material detection process p and/or a current detection process d.

Figure 7:
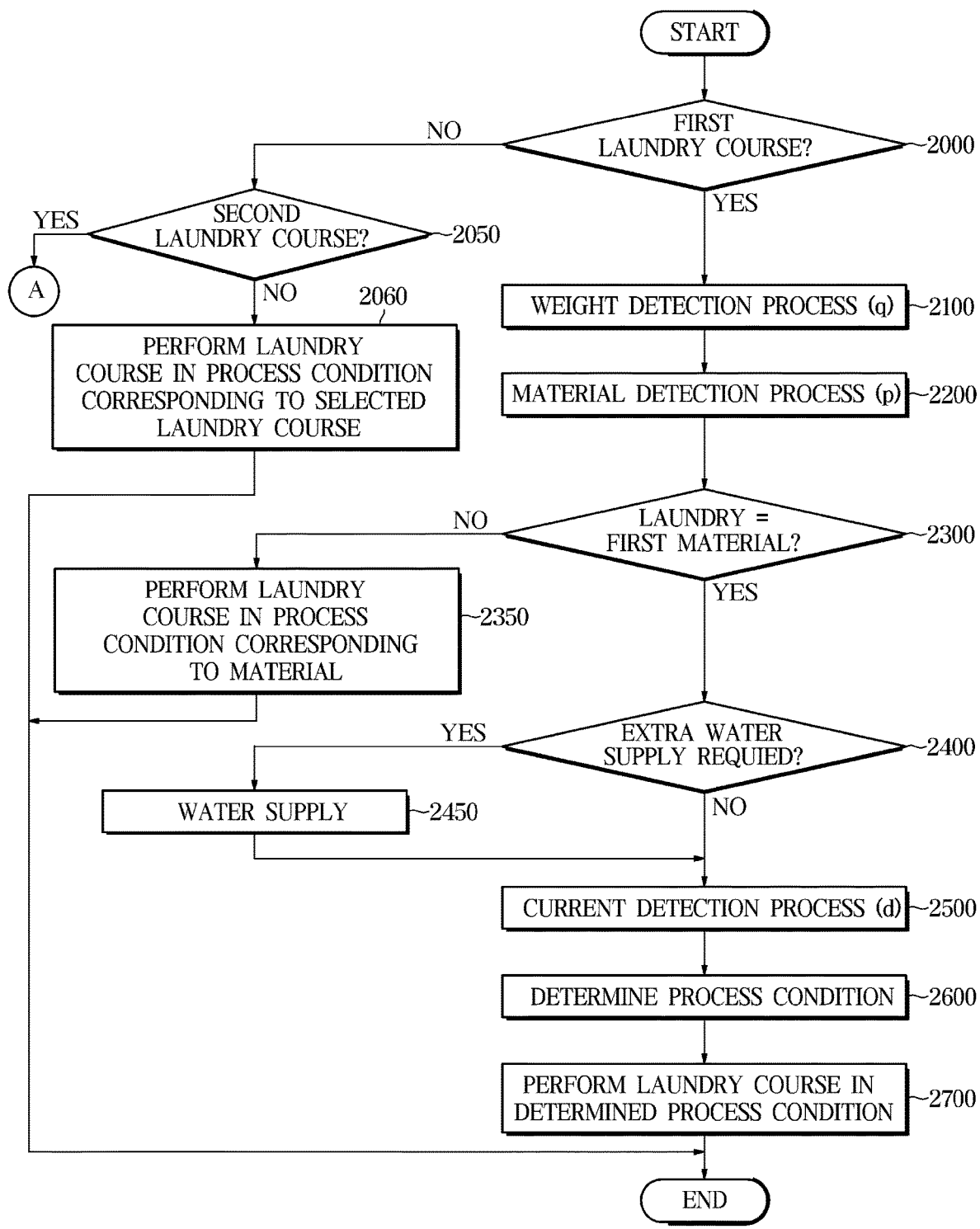
FIG. 7 is a flowchart illustrating a method in which a washing machine determines a process condition before performing a laundry cycle, according to an embodiment of the disclosure.

FIG. 7 is a flowchart illustrating a method in which a washing machine determines a process condition before performing a laundry cycle, according to an embodiment of the disclosure.

As described above, the user may deliver information about a material and/or a type of the laundry to the washing machine 10 by selecting a laundry course corresponding to the material of the laundry.

For example, the user may select a laundry course corresponding to "wool", and the washing machine 10 may perform the laundry cycle 1000 in a process condition corresponding to the "wool washing course" in response to a selection of the "wool washing course".

The user may select a laundry course he/she wants through the control panel 110, and start the laundry cycle 1000 by selecting a button to start doing the laundry.

In this regard, however, the user may feel difficulty in selecting a laundry course associated with the clothes thrown by the user and it may be annoying for the user to set a laundry course in detail.

Hence, the user may want the washing machine 10 to automatically figure out the type and/or the material of the clothes and apply a process condition suitable for the type and/or the material of the clothes.

Referring to FIG. 7, the controller 190 may proceed the laundry cycle 1000 based on reception of a user input to start the laundry cycle 1000.

The controller 190 may generally proceed the laundry cycle 1000 based on a process condition corresponding to a laundry course selected by the user.

For example, the controller 190 may perform the laundry cycle 1000 in a process condition corresponding to a laundry course selected by the user in 2060 based on the laundry course not corresponding to a first laundry course in 2000 and a second laundry course in 2050.

For example, the laundry course not corresponding to the first laundry course and the second laundry course may include a "wool washing course" for washing wool clothes, a "denim washing course" for washing denim clothes, and/or a "delicate washing course" for washing delicate clothes.

When the laundry course selected by the user does not correspond to the first washing course and the second washing course, the laundry cycle 1000 may further include a laundry measurement process for measuring the weight of the laundry before the water supply 1011.

In the disclosure, the first laundry course may include a universal laundry course in which a type and/or a material of the laundry is not clearly specified, without being limited thereto.

Furthermore, in the disclosure, the second laundry course may include a laundry course for doing the laundry having a large or small volume for the weight, e.g., bedclothes, and/or a laundry course for washing the material, e.g., a normal material, of the laundry with a large or small volume for the weight, without being limited thereto.

Figure 8:
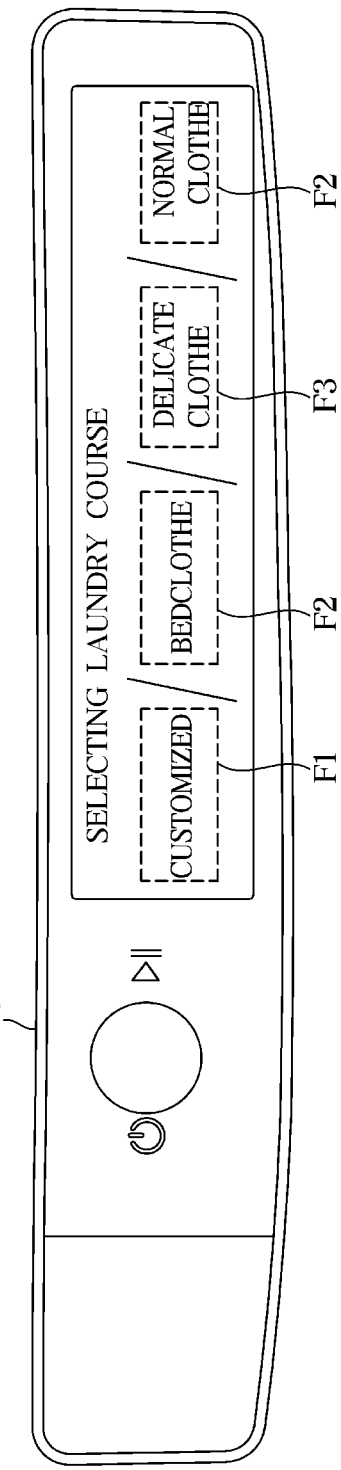
FIG. 8 illustrates an example of a plurality of laundry courses provided by a washing machine, according to an embodiment of the disclosure.

FIG. 8 illustrates an example of a plurality of laundry courses provided by a washing machine, according to an embodiment of the disclosure.

Referring to FIG. 8, the washing machine 10 may provide a user interface that allows the user to select one of the plurality of laundry courses through the control panel 110.

The plurality of laundry courses may include a universal laundry course in which a type and/or a material of the laundry is not clearly specified, e.g., a customized course F1, a laundry course for washing clothes, e.g., bedclothes, with a large or small volume for the weight, e.g., a bedclothes course F2, a laundry course for washing a material, e.g., a normal material, of clothes with a large or small volume for the weight, e.g., a bedclothes and/or normal cloth course F2, and a laundry course in which a type and/or a material of the laundry may be clearly specified, e.g., a delicate course F3.

In various embodiments of the disclosure, the first laundry course may include the customized course F1, and the second laundry course may include the bedclothes and normal cloth course F2.

The delicate course F3 may be a laundry course that does not correspond to the first laundry course and the second laundry course.

Figure 9:
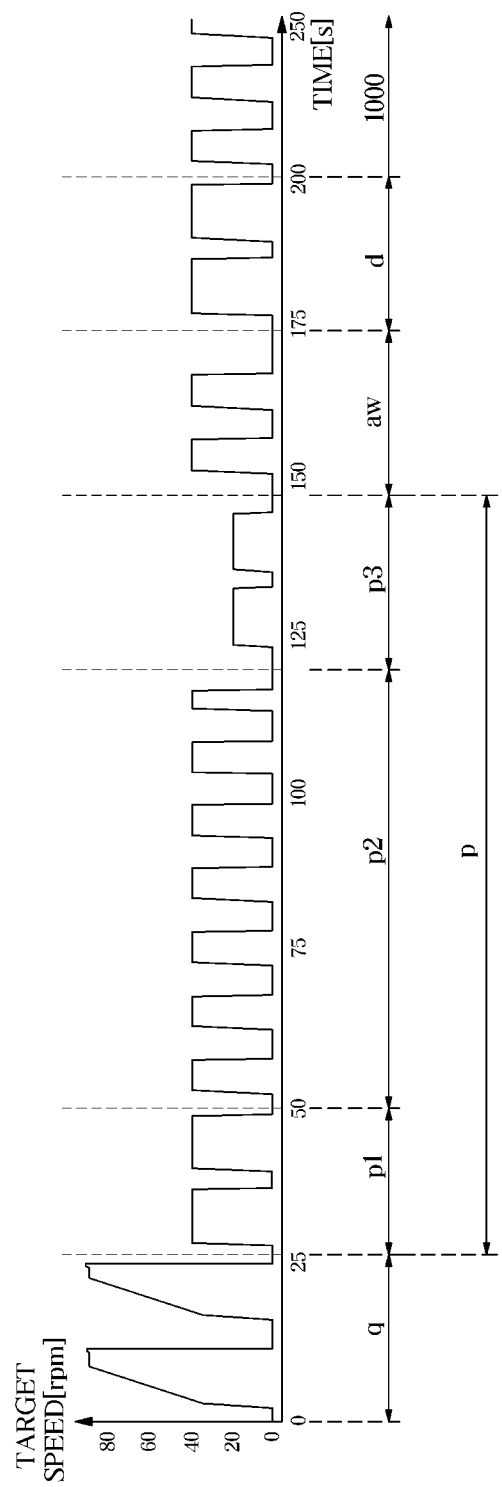
FIG. 9 illustrates target speed of a motor over time until a washing machine performs a laundry cycle when the user selects a first laundry course, according to an embodiment of the disclosure.

FIG. 9 illustrates target speed of a motor over time until a washing machine performs a laundry cycle when the user selects the first laundry course, according to an embodiment of the disclosure.

Referring to FIG. 9, the controller 190 may perform at least one process for figuring out weight and a material of the laundry before performing the laundry cycle 1000 when the first laundry course is selected.

For example, the controller 190 may perform the weight detection process q in 2100 based on the first laundry course selected in 2000.

The controller 190 may control the driver 140 to repeatedly turn on/off the motor 141 to perform the weight detection process q and measure the loads (weight of the clothes) in the drum 130 based on the value of counter electromotive force produced when the motor 141 is turned off. In another example, the controller 190 may provide a target speed command to rotate the drum at a first target speed to the driver 140, and measure loads (weight of the clothes) in the drum 130 based on time spent until the drum 130 reaches the first target speed. The memory 192 may store data about a weight value measured through the weight detection process q.

The controller 190 may perform the weight detection process p in 2200 based on the first laundry course selected in 2000.

Figure 10:
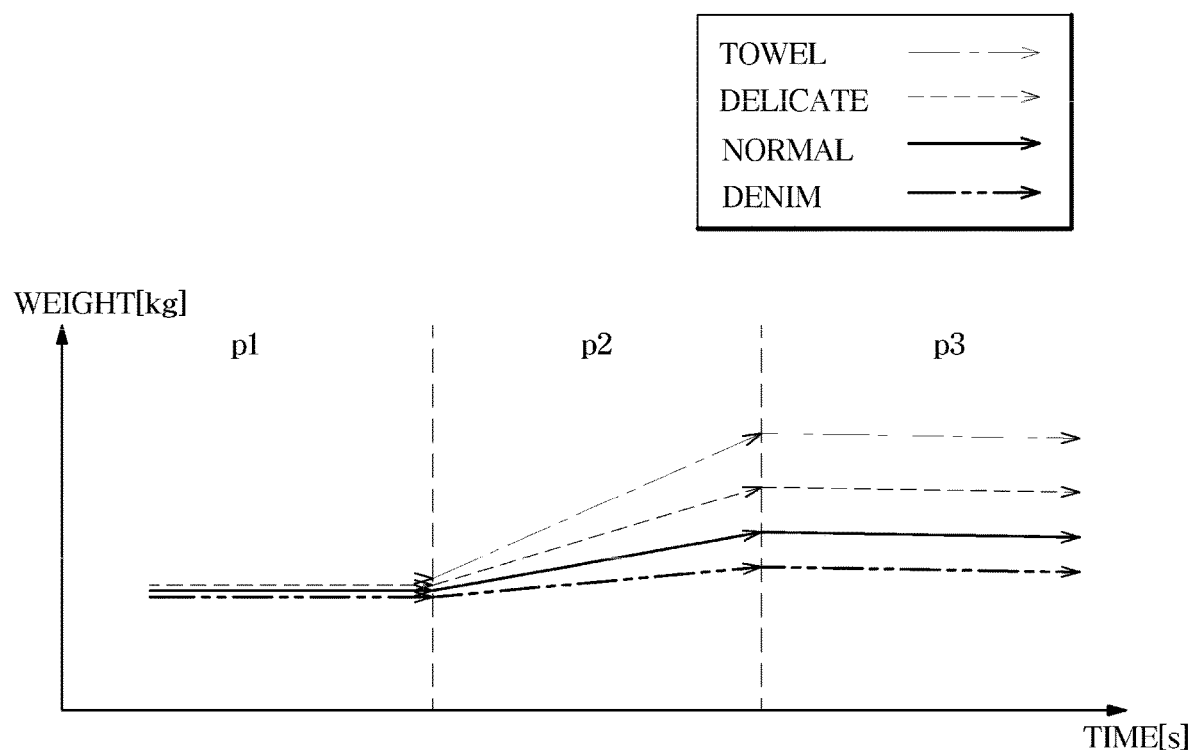
FIG. 10 represents changes in weight of wet clothes depending on the material of the clothes.

FIG. 10 represents changes in weight of wet clothes depending on the material of the clothes.

Referring to FIG. 10, a degree of keeping water, i.e., an amount of retaining moisture, is different depending on the material of the laundry. Even when water is supplied to the same water level for clothes with the same weight measured in a dried state, weight measured when the clothes are in a wet state after the water supply may vary by the material of the clothes.

For example, as a material like the towel may retain a large amount of water and a material like the denim may retain a small amount of water, when water is supplied to the same level for the clothes of the two materials, a more amount of water is actually supplied for the towel and the towel weighs heavier in the wet state when measured.

To determine the material of the laundry based on the aforementioned properties of the clothes, the material detection process p may include at least one water supply process and at least two rotation processes.

For example, the material detection process p may include a first rotation process p1 for rotating the drum 130 containing dry laundry and measuring a value of driving current through the current sensor 91, a water supply process p2 for rotating the drum 130 and supplying water to the tub 120 to a preset water level, and a second rotation process p3 for rotating the drum 130 after the water supply process p2 is finished and measuring a value of driving current through the current sensor 91.

The controller 190 may control the driver 140 to rotate the drum 130 at a first rotation speed to perform the first rotation process p1, control the water supplier 150 to perform the water supply process p2, control the driver 140 to stir the drum 130 during the water supply process p2, and control the driver 140 to rotate the drum 130 at a second rotation speed to perform the second rotation process p3.

In various embodiments of the disclosure, the first rotation speed, a target speed for the first rotation process p1 may be faster than the second rotation speed, a target speed for the second rotation process p3.

The controller 190 may determine a material of the laundry based on the value of driving current measured by the current sensor 91 in the first rotation process p1, the value of driving current measured by the current sensor 91 in the water supply process p2, and/or the value of driving current measured by the current sensor 91 in the second rotation process p3.

For example, the controller 190 may determine a material of the laundry based on an average (a dry cloth current average) of values of driving current measured by the current sensor 91 in the first rotation process p1, an average (a wet clothe current average) of values of driving current measured by the current sensor 91 in the second rotation process p3, and/or the standard deviation (the wet cloth standard deviation) of values of driving current measured by the current sensor 91 in the second rotation process p3.

In various embodiments of the disclosure, to determine a material of the laundry more accurately, the material detection process p may include multiple water supply processes and multiple rotation processes performed before and after the multiple water supply processes are proceeded.

In various embodiments of the disclosure, the controller 190 may use a classifier trained in advance by machine learning in performing determination of a material of the laundry.

The classifier for determining a material of the laundry may be trained based on a deep learning model, which is a type of machine learning or machine learning model. For example, at least one of various neural networks such as an artificial neural network, a deep neural network, a convolutional neural network (CNN), a recurrent neural network (RNN), etc., may be used to train the classifier.

Training data used to train the classifier may include input data and expected output data. The input data may be data related to a value of the current to the motor 141 obtained in the material detection process or other process, and the expected output data may be data related to a material of the laundry.

When the data about the value of the current to the motor 141 is input to a machine learning model, data about the material of the laundry may be output through a hidden layer. A value of loss representing a difference between the output data and the expected output data may be calculated, and the classifier may be trained by adjusting the weight of the hidden layer in a way of minimizing the value of loss.

The classifier that has completed the learning may be stored in the controller 190, and the controller 190 may infer the material of the laundry by inputting data about a value of driving current to the motor 141 obtained during the use of the washing machine 10 to the classifier.

The classifier may be trained and stored in a manufacturing stage of the washing machine 10. It is also possible that the classifier is updated after the washing machine 10 is sold. For example, the washing machine may update the classifier by accessing an external server through the communication device 195 equipped in the washing machine 10, and the controller 190 may retrain the classifier itself with data obtained during the use of the washing machine 10.

The controller 190 may determine a material of the laundry in the material detection process p and store data about the material of the laundry in the memory 192.

The controller 190 may perform the current detection process d in 2500 based on the material of the laundry determined as a first material in 2300.

On the other hand, based on the material of the laundry determined as other material than the first material, e.g., a second material, in 2300, the controller 190 may perform the laundry cycle 1000 in a process condition corresponding to the determined material in 2350 without proceeding the current detection process d.

That is, when the material of the laundry is determined as the first material, the controller 190 may additionally perform the current detection process d.

According to the disclosure, the current detection process is additionally performed when the material of the laundry is determined as a particular material, thereby reducing time required to accurately figure out the type of the laundry.

The first material may refer to a material of the laundry that has a large or small volume for the weight, e.g., bedclothes. For example, the first material may include a normal cloth material.

In the material detection process p, bulky bedclothes is indistinguishable from normal clothes because the bedclothes has the small moment of inertia and are not sufficiently moistened even after the completion of water supply due to the outer skin to protect the filling. As a result, bulky bedclothes are not distinguished in the material detection process p because of having overlapping properties with the normal clothes in terms of the dry cloth current average, the wet cloth current average, and the wet clothe current standard deviation, and thus classified as normal clothes. However, unlike the normal clothes, the bulky bedclothes need relatively many resources for the laundry process and require a bit relaxed vibration limit criteria by reflecting little movement of the clothes even in the dehydrating process.

Accordingly, even when the material of laundry is determined as a normal cloth material in the material detection process p, there is a need to change the process condition according to whether the laundry corresponds to bulky bedclothes or normal clothes with small volume.

In the disclosure, the current detection process d is separate from the weight detection process q and the material detection process p, and refers to a process for estimating a density of the laundry.

In various embodiments of the disclosure, the memory 192 may store data about a reference water level required to perform the current detection process d.

When the material of the laundry is determined as a first material, the controller 190 may determine whether the water level in the tub 120 reaches the reference water level for performing the current detection process d, in 2400.

When the water level in the tub 120 reaches the reference water level for performing the current detection process d through the water supply process p2 of the material detection process p, the controller 190 may perform the current detection process d without extra water supply, in 2500.

On the other hand, when the water level in the tub 120 is lower than the reference water level for performing the current detection process d, the controller 190 may perform a water supply process aw before performing the current detection process d, in 2450.

The water supply process aw may refer to a process for supplying water into the tub 120 while rotating the drum 130 as described above.

The controller 190 may perform the current detection process d based on the water level in the tub 120 reaching the reference water level, in 2500.

The current detection process d may refer to a process for measuring a value of driving current while rotating the drum 130. A target rotation speed and/or an operation rate of the drum 130 in the current detection process d may be different from a target rotation speed and/or an operation rate of the drum 130 in the first rotation process p1 or the second rotation process p3.

For example, the target rotation speed of the drum 130 in the current detection process d may be higher than the target rotation speed of the drum 130 in the second rotation process p3.

In the disclosure, by rotating the drum 130 at a speed optimized to estimate a density of the laundry instead of the speed for material detection of the laundry in the current detection process d, an accurate density of the laundry may be estimated.

The controller 190 may determine whether the laundry corresponds to normal clothes or bulky bedclothes based on a value of driving current detected by the current sensor 91 in the current detection process d.

When the laundry is determined to correspond to the bulky bedclothes, the controller 190 may determine the process condition of the first laundry course as the first process condition, and when the laundry is determined to correspond to the normal clothes, the controller 190 may determine the process condition of the first laundry course as the second process condition corresponding to the normal clothes.

That is, the controller 190 may determine a process condition of the first laundry course based on the value of driving current detected by the current sensor 91 in the current detection process d and a weight value of the laundry determined in the weight detection process q, in 2600.

Figure 11:
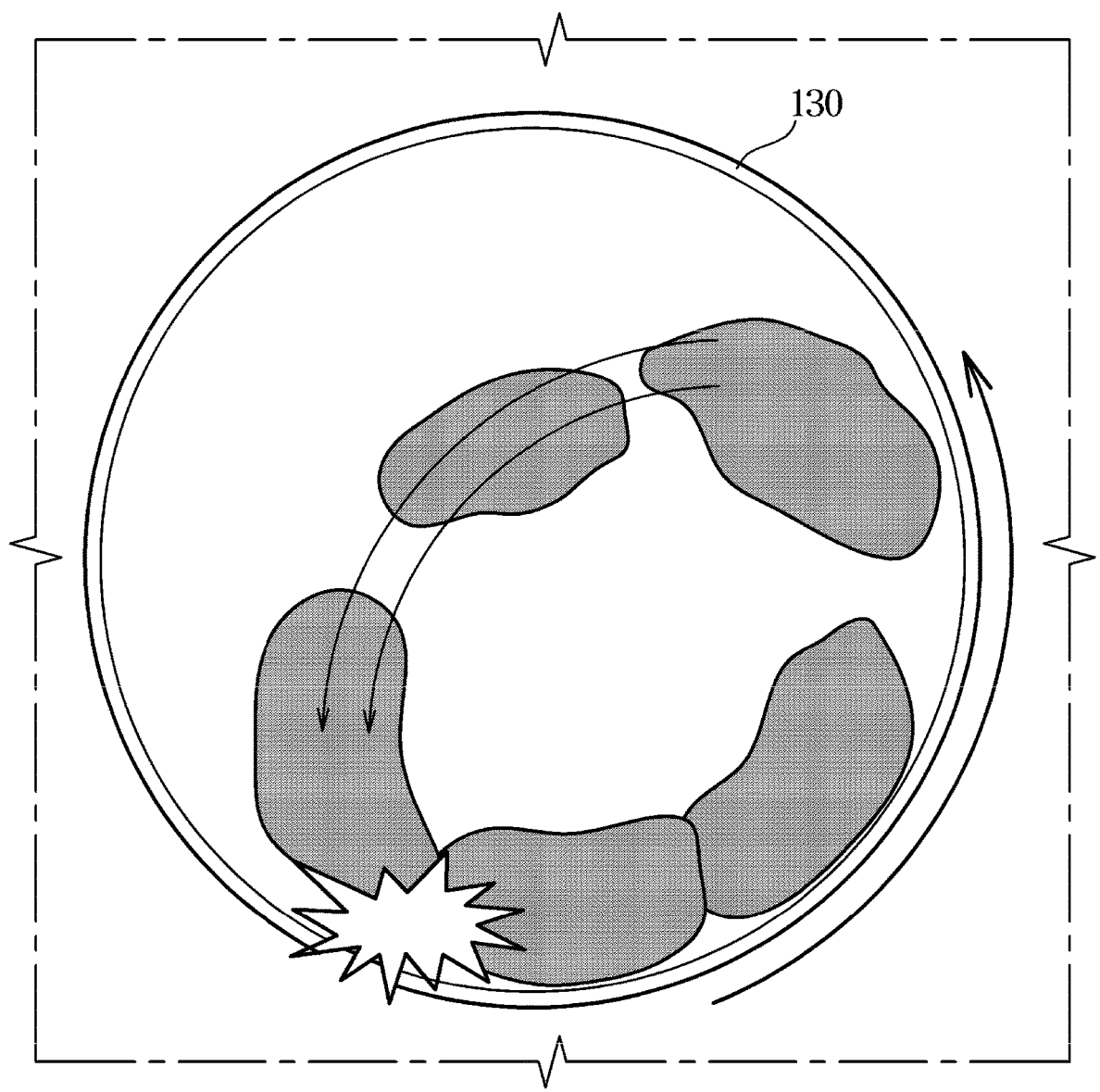
FIG. 11 illustrates laundry with a small volume for the weight being rotated in a drum.
Figure 12:
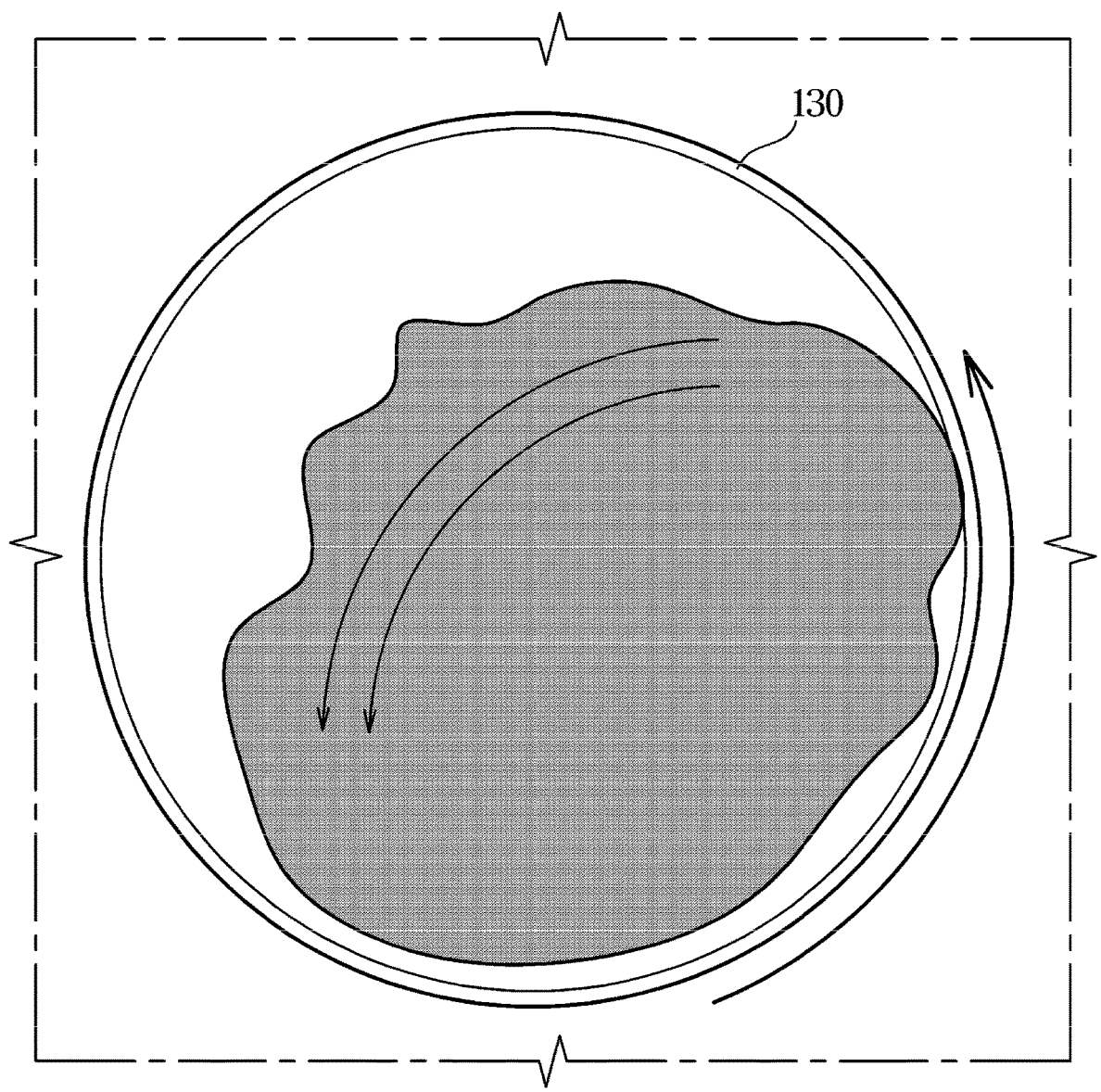
FIG. 12 illustrates laundry with a large volume for the weight being rotated in a drum.
Figure 13:
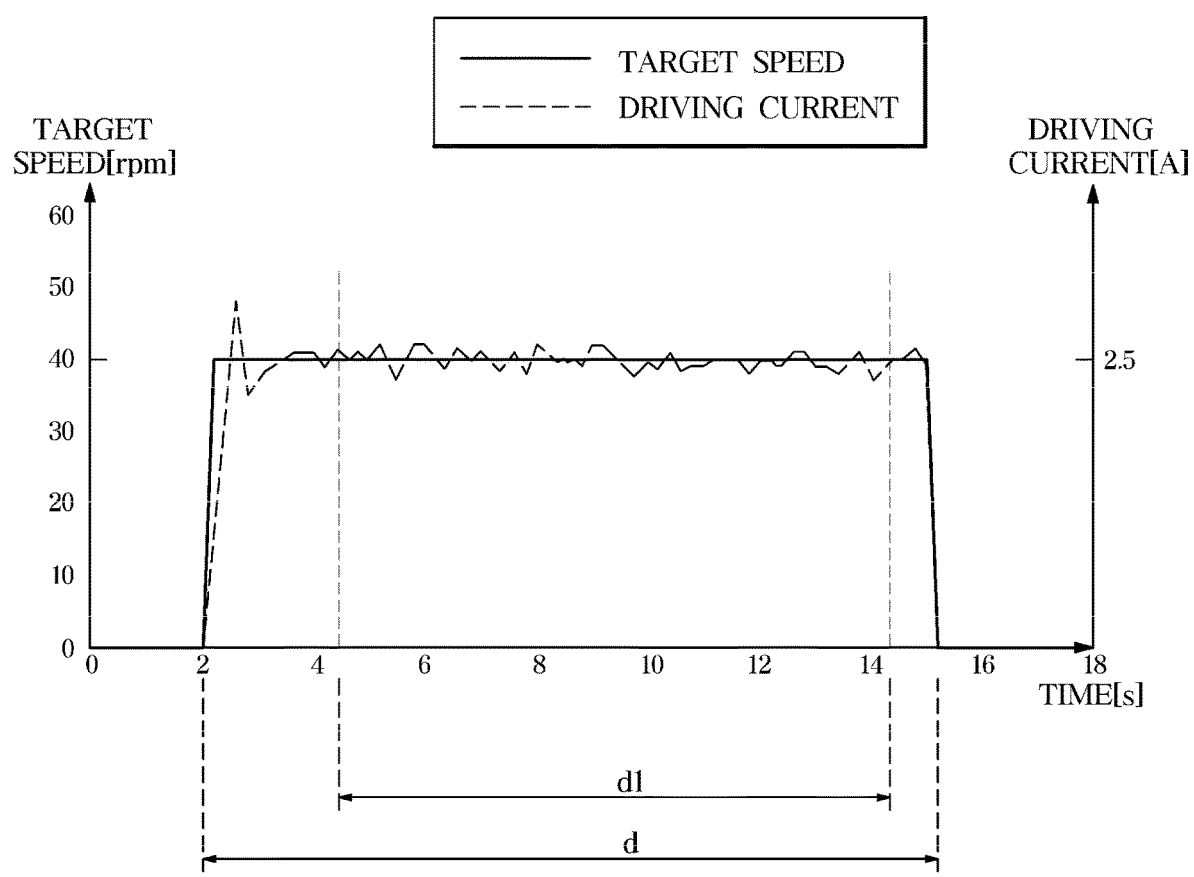
FIG. 13 illustrates changes in driving current according to target speed of a motor in a current detection process when a drum of a washing machine contains laundry with a small volume for the weight, according to an embodiment of the disclosure.
Figure 14:
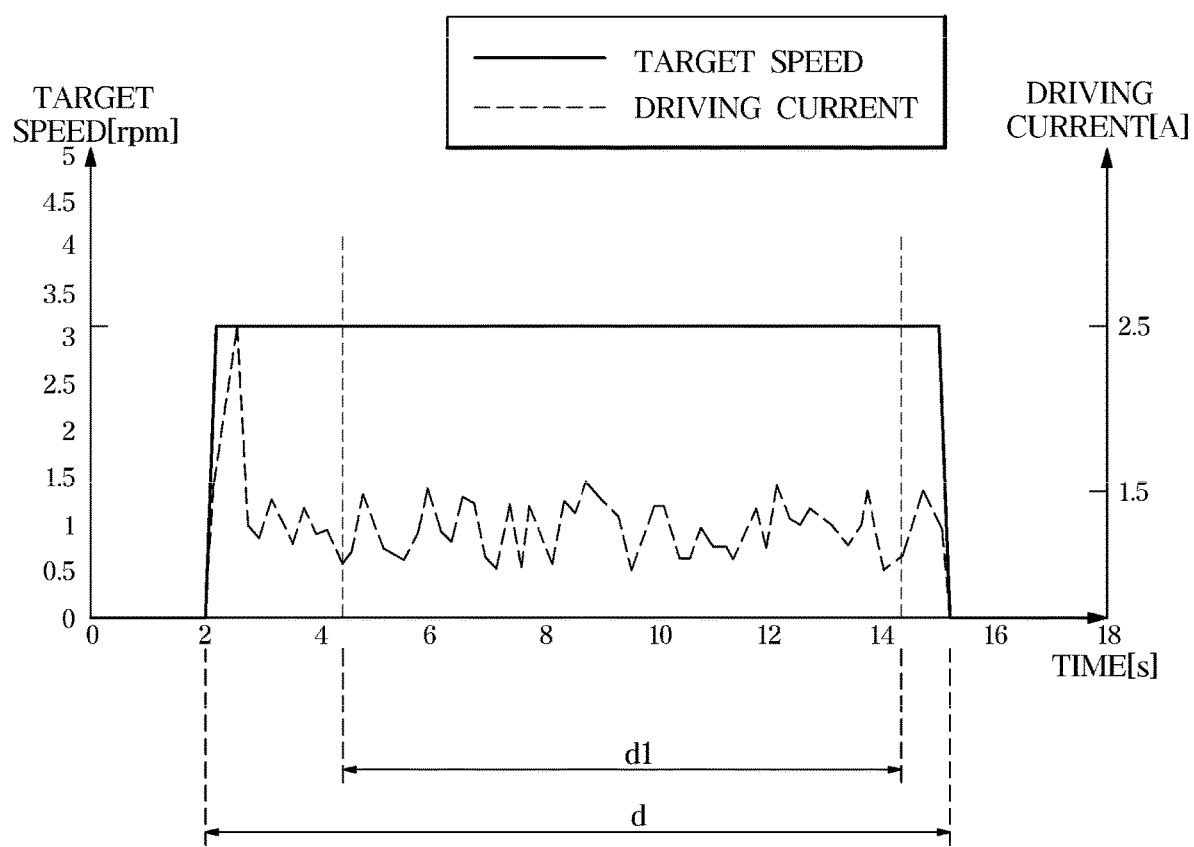
FIG. 14 illustrates changes in driving current according to target speed of a motor in a current detection process when a drum of a washing machine contains laundry with a large volume for the weight, according to an embodiment of the disclosure.

FIG. 11 illustrates laundry with a small volume for the weight being rotated in the drum 130, and FIG. 12 illustrates laundry with a large volume for the weight being rotated in the drum 130. FIG. 13 illustrates changes in driving current according to target speed of a motor in a current detection process when the drum 130 of the washing machine 10 contains laundry with a small volume for the weight, according to an embodiment of the disclosure, and FIG. 14 illustrates changes in driving current according to target speed of a motor in a current detection process when the drum 130 of the washing machine 10 contains laundry with a large volume for the weight, according to an embodiment of the disclosure.

Referring to FIGS. 11 and 12, normal clothes and bedclothes with the same weight have different movement properties.

For example, the normal clothes with a small volume fall from a certain position in the drum 130 at a certain water level, e.g., the reference water level for performing the current detection process d, and a certain speed, e.g., the target speed of the drum 130 in the current detection process d, and cause a change in torque applied to the drum 130 when falling. Hence, for the normal clothes with the small volume, an average of values of driving current to rotate the drum 130 at the certain water level and at the certain speed is large.

On the other hand, for the bedclothes with the large volume, an average of values of driving current to rotate the drum 130 at the certain water level and at the certain speed is small because the bedclothes have the small moment of inertia.

As a result, when the drum 130 containing laundry with the same weight condition is rotated at the certain water level and at the certain speed, whether the laundry corresponds to bulky bedclothes or normal clothes may be determined.

Referring to FIGS. 13 and 14, when the laundry corresponds to the normal clothes rather than the bulky bedclothes, it is seen that the average of values of driving current applied to the motor 141 to rotate the drum 130 at the target speed is large.

In an embodiment of the disclosure, the controller 190 may determine a density value corresponding to the density of the laundry based on a ratio of the average of values of driving current detected in the current detection process d and a weight value of the laundry.

To calculate a more reliable average of values of driving current, the controller 190 may calculate an average of values of driving current detected during a period d1 from when a preset time (e.g., about 2 seconds) elapses after the start of the current detection process d before completion of the current detection process d.

The density value corresponding to the density of the laundry may be proportional to the density of the laundry.

The controller 190 may determine the process condition of the first laundry course as the first process condition when the density value corresponding to the density of the laundry is smaller than a preset value and determine the process condition of the first laundry course as the second process condition when the density value is equal to or larger than the preset value.

For example, the density value corresponding to the density of the clothes may be a value obtained by dividing the average of values of driving current detected in the current detection process d by the weight of the laundry.

The controller 190 may perform the laundry cycle 1000 in the determined process condition based on the determining of the process condition of the first laundry course, in 2700.

The first process condition applied when the density value corresponding to the density of the laundry is smaller than the preset value may be a process condition optimized for thick bedclothes.

On the other hand, the second process condition applied when the density value corresponding to the density of the laundry is equal to or greater than the preset value may be a process condition optimized for normal bedclothes.

An amount of a detergent, an amount of water and/or time required to complete the laundry cycle 1000 according to the first process condition may be larger than an amount of the detergent, an amount of water and/or time required to complete the laundry cycle 1000 according to the second process condition.

In other words, an amount of a detergent, an amount of water and time required to wash heavy bedclothes may be larger than an amount of the detergent, an amount of water and time required to wash the normal clothes.

In the disclosure, when a material of the laundry is classified as a particular material, the laundry cycle 1000 optimized for the type of the laundry may be performed by performing an additional process for identifying the type of the laundry.

Furthermore, in the disclosure, normal clothes and bulky bedclothes may be effectively distinguished from each other without an extra hardware component such as a camera.

Figure 15:
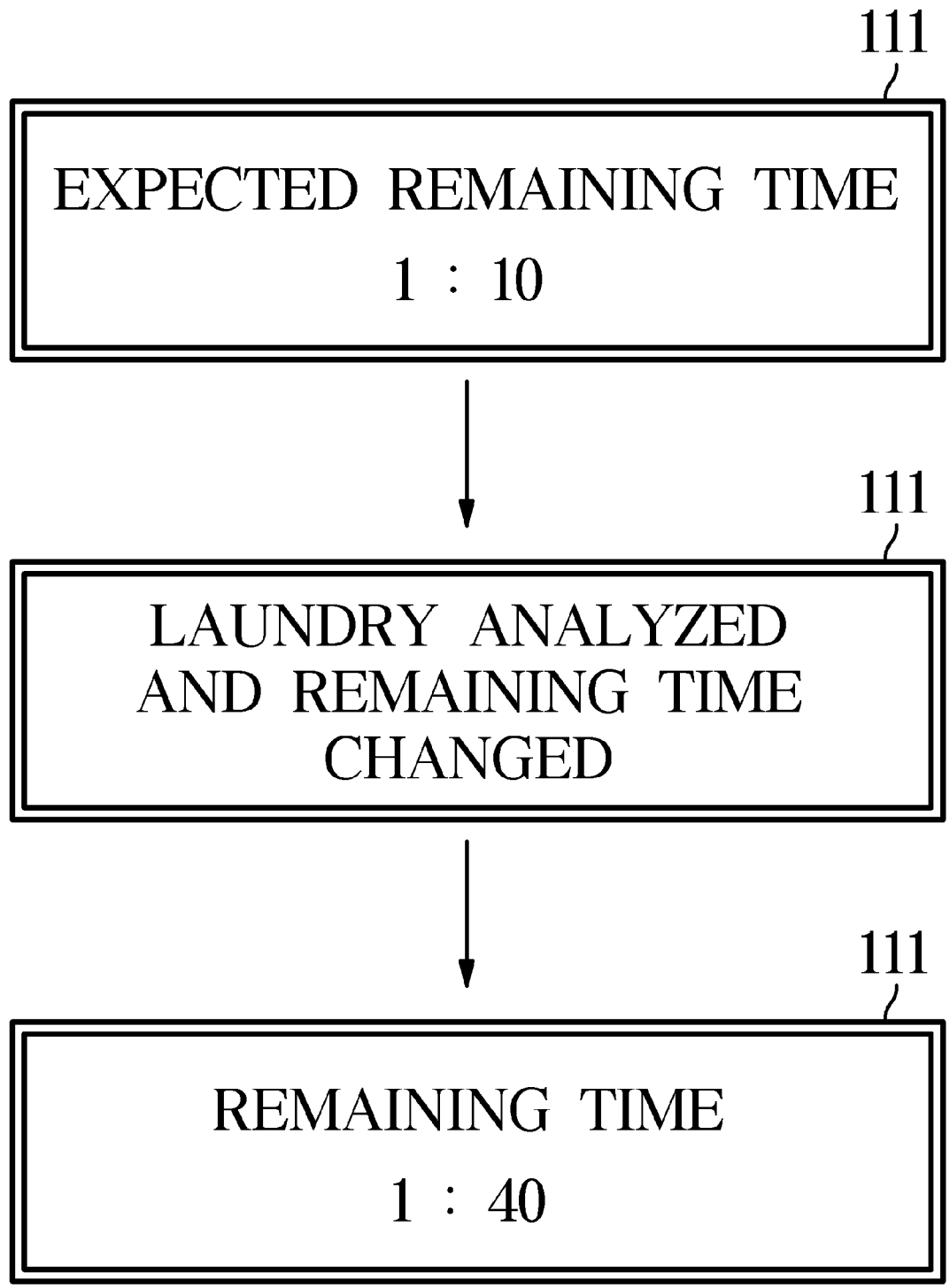
FIG. 15 illustrates an example of a procedure for changing remaining time displayed on a display when the user selects a first laundry course.

FIG. 15 illustrates an example of a procedure for changing remaining time displayed on a display when the user selects a first laundry course.

Referring to FIG. 15, when the user selects the first laundry course, the remaining time displayed on the display 111 may vary according to a process condition applied to the laundry cycle 1000.

The display 111 may display the remaining time of the laundry course (e.g., the first laundry course and/or the second laundry course) selected by the user.

The remaining time displayed on the display 111 may refer to a time (laundry time) left until the laundry cycle 1000 is completed.

In various embodiments of the disclosure, the controller 190 may control the display 111 to display a default remaining time based on a selection of the first laundry course.

For this, the memory may store data about the default remaining time corresponding to the first laundry course.

The default remaining time may be set in advance based on a time usually required to complete the laundry course. For example, the default remaining time may be set to an average time required to complete the laundry cycle 1000 for normal clothes, without being limited thereto.

In an embodiment of the disclosure, the controller 190 may change the default remaining time based on a laundry history of the washing machine 10. For example, the controller 190 may change the default remaining time based on the time required for the laundry cycle 1000 performed in the past, based on the selection of the first laundry course.

In various embodiments of the disclosure, the controller 190 may control the display 111 to output a visual indication indicating that the washing machine 10 is analyzing the laundry to determine a process condition until the process condition of the first laundry course is determined based on the selection of the first laundry course.

For example, the display 111 may output a message "analyzing the laundry to calculate an expected laundry time" until the process condition of the first laundry course is determined.

The controller 190 may output a visual indication indicating that the remaining time for the first laundry course has been changed, based on the determination of the process condition of the first laundry course.

For example, the display 111 may output a message "laundry has been analyzed and remaining time has been changed".

Furthermore, the controller 190 may control the display 111 to change the default remaining time to a remaining time corresponding to the determined process condition based on the determination of the process condition of the first laundry course.

For example, when the default remaining time is set to 1 hour 10 minutes and the remaining time corresponding to the process condition of the first laundry course is determined to be 1 hour 40 minutes, the display 111 may change the remaining time from 1 hour 10 minutes that has thus far been displayed to 1 hour 40 minutes.

In various embodiments of the disclosure, based on the determination of a process condition of the first laundry course, the controller 190 may control the communication device 195 to transmit information about the remaining time corresponding to the determined process condition to the user terminal.

Furthermore, the controller 190 may control the communication device 195 to transmit a message indicating that the remaining time has been changed to the user terminal, based on the determination of the process condition of the first laundry course.

The user terminal may receive the information about the determined remaining time of the first laundry course from the washing machine 10 and provide the information about the determined remaining time for the user based on a user input.

In the disclosure, by modifying the information about the remaining time provided for the user based on the determination of the process condition of the first laundry course, more accurate laundry time may be provided for the user.

Figure 16:
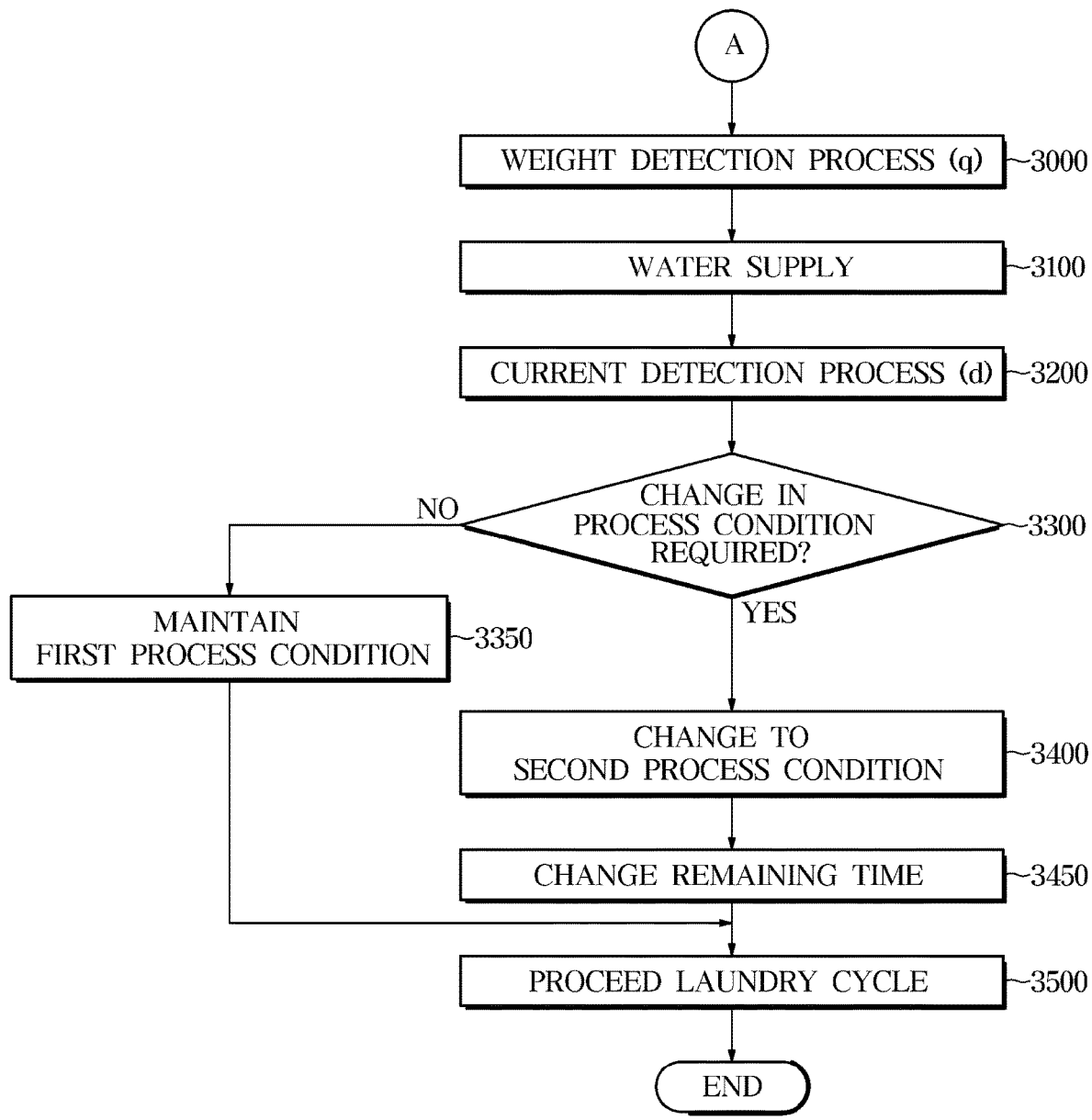
FIG. 16 is a flowchart illustrating a method in which a washing machine changes a process condition before performing a laundry cycle corresponding to a second laundry course, according to an embodiment of the disclosure.
Figure 17:
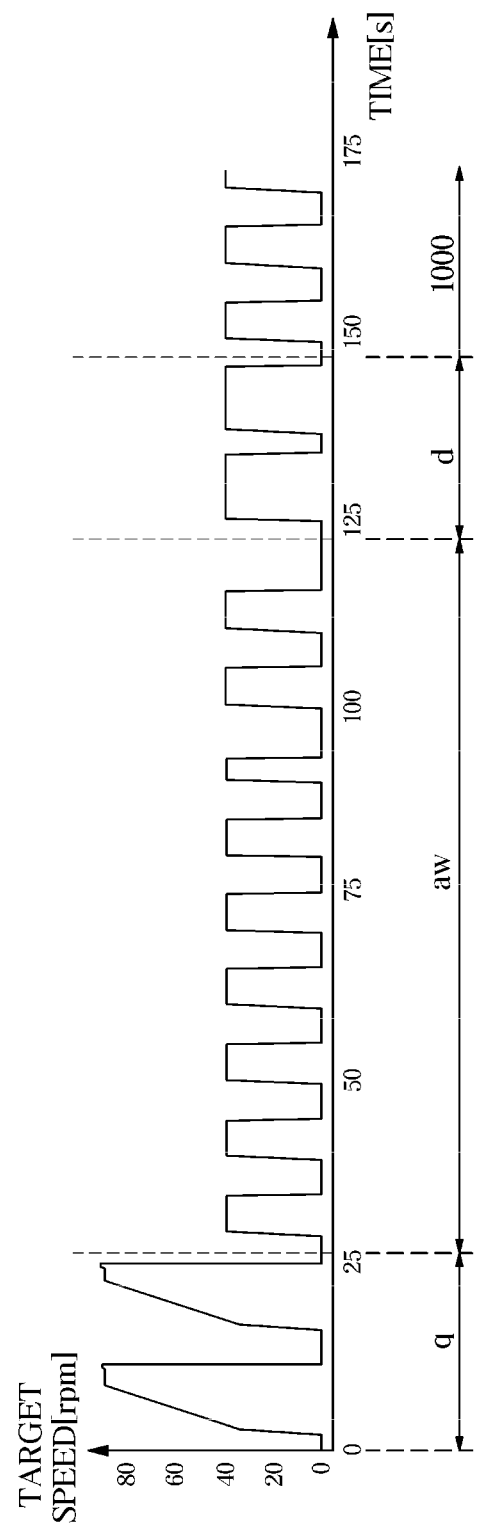
FIG. 17 illustrates target speed of a motor over time until a washing machine performs a laundry cycle corresponding to a second laundry course, according to an embodiment of the disclosure.
Figure 18:
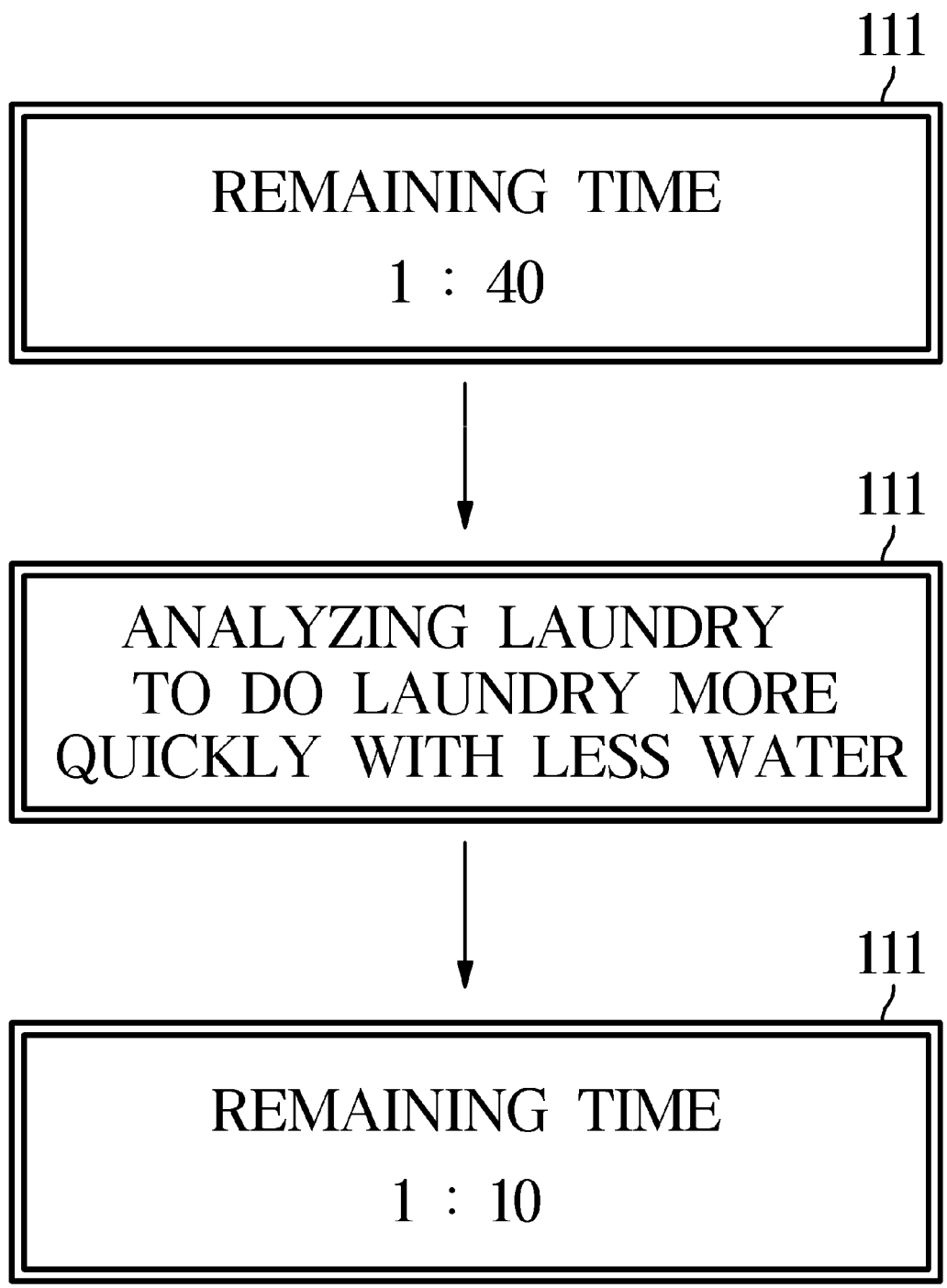
FIG. 18 illustrates an example of a procedure for changing a remaining time displayed on a display when the user selects a second laundry course.

FIG. 16 is a flowchart illustrating a method in which a washing machine changes a process condition before performing a laundry cycle corresponding to a second laundry course, according to an embodiment of the disclosure. FIG. 17 illustrates target speed of a motor over time until a washing machine performs a laundry cycle corresponding to a second laundry course, according to an embodiment of the disclosure. FIG. 18 illustrates an example of a procedure for changing a remaining time displayed on a display when the user selects a second laundry course.

Referring to FIGS. 16 to 18, a method of controlling the washing machine 10 when the user selects the second laundry course will now be described.

As described above, the second laundry course may include a laundry course for washing clothes having a large or small volume for the weight, e.g., bedclothes and/or a laundry course for washing the material, e.g., a normal material, of clothes with a large or small volume for the weight, without being limited thereto.

For example, the second laundry course may include a "bedclothes course" for washing bedclothes and/or a "normal clothe course" for washing normal clothes.

Hence, the second laundry course may be a laundry course to which the first process condition is applied.

In this case, the first process condition may be defined as a process condition corresponding to the bedclothes course when the second laundry course is defined as the bedclothes course, and may be defined as a process condition corresponding to the normal cloth course when the second laundry course is defined as the normal clothe course.

In the following description, for convenience of explanation, the second laundry course is assumed to be the bedclothes course, which is merely an example of the disclosure.

The controller 190 may control the display 111 to display a remaining time corresponding to the bedclothes course, i.e., a remaining time corresponding to the first process condition, based on the selection of the bedclothes course.

For example, the remaining time corresponding to the first process condition may be stored in the memory 192 in advance.

When the user wants to wash bedclothes, it is usually more likely that the user selects the bedclothes course regardless of thickness and/or an amount of filling of the bedclothes.

However, the first process condition corresponding to the bedclothes course may be set to a condition optimized for washing relatively thick bedclothes. The first process condition optimized for washing the relatively thick bedclothes requires more consumption of water and detergent than in the second process condition optimized for washing normal clothes, e.g., thin bedclothes, and thus requires longer laundry time.

Hence, when the user selects the bedclothes course to wash relatively thin bedclothes, it may cause excessive water and detergent consumption and cause an increase in laundry time, leading to inconvenience of the user.

In an embodiment of the disclosure, when the user selects the bedclothes course but the laundry is determined as thin bedclothes, the laundry cycle 1000 is performed in a process condition corresponding to the thin bedclothes, thereby preventing excessive consumption of water and detergent and an increase in laundry time.

For this, the controller 190 may perform the weight detection process q in 3000 based on the selection of the second laundry course in 2050 of FIG. 9.

As described above, the weight detection process q is a process of detecting weight of the laundry.

The controller 190 may perform the water supply process aw to perform the current detection process d based on completion of the weight detection process q, in 3100.

As described above, the controller 190 may perform the water supply process aw until the water level in the tub 120 reaches the reference water level for performing the current detection process d, and terminate the water supply process aw based on the water level in the tub 120 reaching the reference water level for performing the current detection process d.

Unlike the case that the user selects the first laundry course, when the user selects the second laundry course, the type of the laundry is estimated as bedclothes, so the controller 190 may skip the material detection process p.

In the disclosure, by skipping the material detection process when the user selects the second laundry course, a total laundry time may be reduced.

As described above, the controller 190 may determine whether the laundry corresponds to the normal clothes, e.g., thin bedclothes, or bulky bedclothes based on the value of driving current detected by the current sensor 91 in the current detection process d.

Specifically, the controller 190 may determine a density value corresponding to a density of the laundry based on a ratio of an average of values of driving current detected in the current detection process d and a weight value of the laundry, determine the laundry as bulky bedclothes when the density value corresponding to the density of the laundry is smaller than a preset value, and determine the laundry as normal clothes (e.g., thin bedclothes) when the density value corresponding to the density of the laundry is larger than the preset value.

The controller 190 may determine whether to change the first process condition based on the density value corresponding to the density of the laundry, in 3300.

As the first process condition corresponding to bulky bedclothes is already applied to the second laundry course, the first process condition may be maintained when the laundry is determined as the bulky bedclothes and the first process condition may need to be changed to the second process condition when the laundry is determined as thin bedclothes.

The controller 190 may determine that there is no need to change the first process condition when the density value corresponding to the density of the laundry is smaller than the preset value, in 3300.

Accordingly, the controller 190 may maintain the first process condition in 3350 and proceed the laundry cycle 1000 in 3500 when the density value corresponding to the density of the laundry is smaller than the preset value.

When the first process condition is maintained, the remaining time displayed on the display 111 may not be changed.

On the other hand, when the density value corresponding to the density of the laundry is equal to or greater than the preset value, the controller 190 may determine that there is a need to change the first process condition, in 3300.

Accordingly, the controller 190 may change the first process condition to the second process condition when the density value corresponding to the density of the laundry is equal to or greater than the preset value.

As the remaining time corresponding to the first process condition is displayed on the display 111, when the process condition of the laundry cycle 1000 is changed to the second process condition from the first process condition, the remaining time displayed on the display 111 also needs to be changed.

The controller 190 may control the display 111 to change the remaining time corresponding to the first process condition to a remaining time corresponding to the second process condition in 3450 based on a change from the first process condition to the second process condition in 3400.

The controller 190 may proceed the laundry cycle 1000 based on the second process condition, in 3500.

Furthermore, the controller 190 may output a visual indication indicating that the remaining time corresponding to the first process condition has been changed to the remaining time corresponding to the second process condition based on the change from the first process condition to the second process condition in 3400.

The visual indication indicating that the remaining time corresponding to the first process condition has been changed to the remaining time corresponding to the second process condition may include a visual indication indicating that less washing resources are required to perform the laundry cycle 1000.

For example, the display 111 may output a message "analyzing the laundry to do the laundry more quickly with less water".

In various embodiments of the disclosure, based on the change from the remaining time corresponding to the first process condition to the remaining time corresponding to the second process condition, the controller 190 may control the communication device 195 to transmit information about the remaining time corresponding to the second process condition to the user terminal.

Furthermore, the controller 190 may control the communication device 195 to transmit a message indicating that the remaining time has been changed to the user terminal, based on the change from the remaining time corresponding to the first process condition to the remaining time corresponding to the second process condition.

The user terminal may receive the information about the determined remaining time of the second laundry course from the washing machine 10 and provide the information about the determined remaining time for the user based on a user input.

According to the disclosure, even when the user selects a certain course that defines a type of the laundry, the type of the laundry is classified in more detail to apply a process condition optimized for the laundry, thereby saving washing resources.

Furthermore, according to the disclosure, that the washing resources are saved may be notified to the user, thereby increasing feeling of satisfaction of the user.

It is obvious to those of ordinary skill in the art that even under the same process condition, an amount of water for laundry, an amount of detergent, etc., may be different depending on the weight of the laundry.

Hence, determining of a process condition in the disclosure refers to determining of a process condition table corresponding to a laundry course.

For example, that more washing resources are consumed for the first process condition than for the second process condition refers to the first process condition consuming more washing resources than the second process condition under the same weight condition.

Meanwhile, the embodiments of the disclosure may be implemented in the form of a recording medium for storing instructions to be carried out by a computer. The instructions may be stored in the form of program codes, and when executed by a processor, may generate program modules to perform operation in the embodiments of the disclosure. The recording media may correspond to computer-readable recording media.

The computer-readable recording medium includes any type of recording medium having data stored thereon that may be thereafter read by a computer. For example, it may be a read only memory (ROM), a random access memory (RAM), a magnetic tape, a magnetic disk, a flash memory, an optical data storage device, etc.

The computer-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a recording medium (e.g., a compact disc read only memory (CD-ROM)), through an application store (e.g., Play Store™), directly between two user devices (e.g., smart phones), or online (e.g., downloaded or uploaded). In the case of online distribution, at least part of the computer program product (e.g., a downloadable app) may be at least temporarily stored or arbitrarily created in a recording medium that may be readable to a device such as a server of the manufacturer, a server of the application store, or a relay server.

According to an embodiment of the disclosure, laundry having a large volume for the weight may be identified without adding extra hardware, e.g., a camera.

According to an embodiment of the disclosure, a process of ensuring washing performance for the laundry with a bulky volume for the weight, e.g., bedclothes, may be provided.

According to an embodiment of the disclosure, laundry resources may be saved by analyzing a type of laundry in more detail even after the type of the laundry is selected by the user.

According to an embodiment of the disclosure, an accurate time required for a laundry cycle may be provided for the user.

The embodiments of the disclosure have thus far been described with reference to accompanying drawings. It will be obvious to those of ordinary skill in the art that the disclosure may be practiced in other forms than the embodiments as described above without changing the technical idea or essential features of the disclosure. The above embodiments of the disclosure are only by way of example, and should not be construed in a limited sense.

What is claimed is:

1. A washing machine comprising:
   a drum within a tub;
   a driving circuit configured to apply a driving current to a motor to rotate the drum;
   a current sensor configured to detect the driving current applied to the motor that rotates the drum; and
   a controller configured to:
   based on a first laundry course being selected and started, perform a weight detection process measuring a weight of laundry loaded to the drum and a material detection process measuring values of driving currents through the current sensor while the laundry loaded to the drum is dry prior to water being supplied to the drum and while the laundry loaded to the drum is wet subsequent to water being supplied to the drum,
   based on a type of the laundry in the drum being determined as a first material in the material detection process, perform a current detection process in which driving current values are detected while the drum is being rotated,
   determine a process condition to be applied to the first laundry course based on the values of the driving current detected in the current detection process and a value of the weight of the laundry determined in the weight detection process, and
   based on the type of the laundry in the drum being determined as a second material different from the first material in the material detection process, determine the process condition to be applied to the first laundry course to correspond to that of the second material without performing the current detection process.

2. The washing machine of claim 1, wherein the controller is configured to:
   determine a density value corresponding to a density of the laundry based on a ratio of an average of the values of the driving current that are detected in the current detection process and the value of the weight of the laundry, determine the process condition of the first laundry course as a first process condition based on the density value being smaller than a preset value and determine the process condition of the first laundry course as a second process condition based on the density value being equal to or greater than the preset value.

3. The washing machine of claim 1, wherein based on the type of the laundry being determined as the second material in the material detection process, the controller is configured to determine the process condition of the first laundry course to correspond to that of the second material.

4. The washing machine of claim 1, wherein the material detection process comprises:
a first rotation process to rotate the drum,
a water supply process to supply the water into the tub after completion of the first rotation process and a second rotation process to rotate the drum after completion of the water supply process.

5. The washing machine of claim 1, further comprising:
a water level sensor configured to detect a level of the water in the tub,
wherein the controller is configured to perform a water supply process before the current detection process based on the level of the water detected in the tub being lower than a reference water level after the material detection process.

6. The washing machine of claim 1, further comprising:
a display configured to display a remaining time of the first laundry course,
wherein the controller is configured to control the display to display a default remaining time based on a selection of the first laundry course, and control the display to change the default remaining time to a remaining time corresponding to the determined process condition to be applied to the first laundry course.

7. The washing machine of claim 2, wherein at least one of an amount of a detergent, an amount of water or a period of time required to complete a laundry cycle according to the first process condition is greater than an amount of the detergent, an amount of water or a period of time required to complete a laundry cycle according to the second process condition.

8. The washing machine of claim 1, wherein the controller is configured to:
based on a second laundry course, which is different from the first laundry course, being selected and started, perform the weight detection process, a water supply process, and the current detection process, a first process condition being applied to the second laundry course, and
determine whether to change the first process condition based on the value of the driving current detected in the current detection process and the value of weight of the laundry determined in the weight detection process.

9. The washing machine of claim 8, wherein the controller is configured to:
determine a density value corresponding to a density of the laundry based on a ratio of an average of values of the driving currents detected in the current detection process and the value of the weight of the laundry, and change the first process condition to a second process condition based on the density value determined being equal to or greater than a preset value.

10. The washing machine of claim 9, further comprising:
a display configured to display a remaining time of the second laundry course,
wherein the controller is configured to control the display to display a remaining time corresponding to the first process condition based on the selection of the second laundry course, and change the remaining time corresponding to the first process condition to a remaining time corresponding to the second process condition based on the change from the first process condition to the second process condition.

11. A method of controlling a washing machine, the method comprising:
based on a first laundry course being selected and started, performing a weight detection process measuring a weight of laundry loaded to a drum and a material detection process measuring values of driving currents through a current sensor while the laundry loaded to the drum is dry prior to water being supplied to the drum and while the laundry loaded to the drum is wet subsequent to water being supplied to the drum;
based on determining a type of the laundry in in the drum through the material detection process as a first material in the material detection process, performing a current detection process in which driving currents values are detected while the drum is being rotated; and
determining a process condition to be applied to the first laundry course based on the values of driving current detected in the current detection process and a value of the weight of the laundry determined in the weight detection process, and
based on the type of the laundry in the drum being determined as a second material different from the first material in the material detection process, determine the process condition to be applied to the first laundry course to correspond to that of the second material without performing the current detection process.

12. The method of claim 11, wherein the determining of the process condition of the first laundry course comprises
determining a density value corresponding to a density of the laundry based on a ratio of an average of the values of driving current that are detected in the current detection process and the value of the weight of the laundry;
determining the process condition of the first laundry course as a first process condition based on the density value being smaller than a preset value; and
determining the process condition of the first laundry course as a second process condition based on the density value being equal to or greater than the preset value.

13. The method of claim 11, further comprising:
based on the type of the laundry being determined as the second material in the material detection process, determining the process condition of the first laundry course to correspond to that of the second material.

14. The method of claim 11, wherein the material detection process comprises a first rotation process to rotate the drum, a water supply process to supply water into a tub after completion of the first rotation process and a second rotation process to rotate the drum after completion of the water supply process.

15. The method of claim 11, further comprising:
performing a water supply process before the current detection process based on a level of water in a tub being lower than a preset water level after the material detection process.

* * * * *